US012652465B2

(12) United States Patent (10) Patent No.: US 12,652,465 B2

Yamakabe (45) Date of Patent: Jun. 9, 2026

(54) INFORMATION PROCESSING SYSTEM, INFORMATION PROCESSING METHOD, AND NON-TRANSITORY RECORDING MEDIUM

(71) Applicant: NEC Corporation, Minato-ku (JP)

(72) Inventor: Ryo Yamakabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 18/836,823

(22) PCT Filed: Feb. 15, 2022

(86) PCT No.: PCT/JP2022/005858

§ 371 (c)(1),
(2) Date: Aug. 8, 2024

(87) PCT Pub. No.: WO2023/157056

PCT Pub. Date: Aug. 24, 2023

(65) Prior Publication Data

US 2025/0142210 A1     May 1, 2025

(51) Int. Cl.
H04N 23/67 (2023.01)
G06T 7/20 (2017.01)
G06V 10/141 (2022.01)
H04N 23/61 (2023.01)

(52) U.S. Cl.
CPC .............. H04N 23/67 (2023.01); G06T 7/20 (2013.01); G06V 10/141 (2022.01); H04N 23/61 (2023.01)

(58) Field of Classification Search
CPC ...... H04N 23/67; H04N 23/61; G06V 10/141; G06T 7/20

USPC .......................................................... 348/345
See application file for complete search history.

(56) References Cited

U.S. PATENT DOCUMENTS

| | | | |
|---|---|---|---|
| 2009/0073304 A1 | 3/2009 | Kumagai et al. | |
| 2009/0322932 A1 | 12/2009 | Ishiwata | |
| 2010/0128163 A1 | 5/2010 | Nagasaka et al. | |
| 2011/0292272 A1 | 12/2011 | Terashima et al. | |
| 2018/0139380 A1 | 5/2018 | Oogami et al. | |

(Continued)

FOREIGN PATENT DOCUMENTS

| | | |
|---|---|---|
| EP | 4131137 A1 | 2/2023 |
| JP | H11-155095 A | 6/1999 |

(Continued)

OTHER PUBLICATIONS

JP Office Action for JP Application No. 2024-500713, mailed on Aug. 5, 2025 with English Translation.

(Continued)

*Primary Examiner* — Joel W Fosselman

(57) ABSTRACT

An information processing system includes: a velocity setting unit that sets a focus change velocity, which is a velocity for changing a focal length of a camera, on the basis of at least one of information about a target and information about the camera that images the target; a focus control unit that controls the camera to change the focal length of the camera a plurality of times at the focus change velocity; and an imaging control unit that controls the camera to perform imaging with a first focal length and a second focal length. According to such an information processing system, a high-quality image in focus can be captured.

15 Claims, 29 Drawing Sheets

(56) References Cited

U.S. PATENT DOCUMENTS

| | | | |
|---|---|---|---|
| 2020/0304717 A1* | 9/2020 | Park | ..................... H04N 23/673 |
| 2021/0306550 A1 | 9/2021 | Hoda et al. | |
| 2022/0270406 A1 | 8/2022 | Chono et al. | |
| 2023/0083281 A1 | 3/2023 | Oami | |

FOREIGN PATENT DOCUMENTS

| | | | |
|---|---|---|---|
| JP | H11-325851 | A | 11/1999 |
| JP | 2000-237169 | A | 9/2000 |
| JP | 2002-153444 | A | 5/2002 |
| JP | 2008-052317 | A | 3/2008 |
| JP | 2014-145867 | A | 8/2014 |
| JP | 2015-230414 | A | 12/2015 |
| JP | 2018-036509 | A | 3/2018 |
| JP | 2021-158489 | A | 10/2021 |
| WO | 2017/061095 | A1 | 4/2017 |
| WO | 2020/261368 | A1 | 12/2020 |
| WO | 2021/166223 | A1 | 8/2021 |
| WO | 2021/199188 | A1 | 10/2021 |

OTHER PUBLICATIONS

European Search Report for EP Application No. 22926961.8, dated on Feb. 18, 2025.

JP Office Action for JP Application No. 2024-500713, mailed on Jan. 6, 2026 with English Translation.

International Search Report for PCT Application No. PCT/JP2022/005858, mailed on May 17, 2022.

* cited by examiner (a) WHEN TARGET VELOCITY IS LOW (b) WHEN TARGET VELOCITY IS HIGH

10: INFORMATION
PROCESSING SYSTEM

ROTATION DRIVE OF
MIRROR CHANGES
IMAGING RANGE

300

18

10: INFORMATION
PROCESSING SYSTEM

S101 — SET FOCUS CHANGE VELOCITY

S102 — START FOCAL LENGTH CONTROL

S103 — IMAGING WITH FIRST FOCAL LENGTH AND SECOND FOCAL LENGTH

S104 — END FOCAL LENGTH CONTROL

S1001 — SELECT IMAGE

S1002 — AUTHENTICATION PROCESSING USING SELECTED IMAGE

INFORMATION PROCESSING SYSTEM, INFORMATION PROCESSING METHOD, AND NON-TRANSITORY RECORDING MEDIUM

This application is a National Stage Entry of PCT/JP2022/005858 filed on Feb. 15, 2022, the contents of all of which are incorporated herein by reference, in their entirety.

TECHNICAL FIELD

This disclosure relates to technical fields of an information processing system, an information processing method, and a recording medium.

BACKGROUND ART

A known system of this type performs imaging by changing a focal length of a camera. For example, Patent Literature 1 discloses that when a target person moving on a belt conveyor is detected by a sensor, imaging is performed by zooming up a lens of the camera. Patent Literature 2 discloses that the focal position is changed by controlling a liquid lens. Patent Literature 3 discloses that the focal length is changed in accordance with a subject distance in imaging a subject moving toward an information processing system,

CITATION LIST

Patent Literature

Patent Literature 1: JP2002-153444 discloses
Patent Literature 2: International Publication No. WO2020/261368
Patent Literature 3: International Publication No. WO2021/166223

SUMMARY

Technical Problem

This disclosure aims to improve the techniques/technologies disclosed in Citation List.

Solution to Problem

An information processing system according to an example aspect of this disclosure includes: a velocity setting unit that sets a focus change velocity, which is a velocity for changing a focal length of a camera, on the basis of at least one of information about a target and information about the camera that images the target: a focus control unit that controls the camera to change the focal length of the camera a plurality of times at the focus change velocity: and an imaging control unit that controls the camera to perform imaging with a first focal length and a second focal length.

An information processing method according to an example aspect of this disclosure includes: setting a focus change velocity, which is a velocity for changing a focal length of a camera, on the basis of at least one of information about a target and information about the camera that images the target: controlling the camera to change the focal length of the camera a plurality of times at the focus change velocity: and controlling the camera to perform imaging with a first focal length and a second focal length.

A recording medium according to an example aspect of this disclosure is a recording medium on which a computer program that allows at least one computer to execute an information processing method is recorded, the information processing method including: setting a focus change velocity, which is a velocity for changing a focal length of a camera, on the basis of at least one of information about a target and information about the camera that images the target; controlling the camera to change the focal length of the camera a plurality of times at the focus change velocity: and controlling the camera to perform imaging with a first focal length and a second focal length.

DESCRIPTION OF EXAMPLE EMBODIMENTS

Hereinafter, an information processing system, an information processing method, and a recording medium according to example embodiments will be described with reference to the drawings.

First Example Embodiment

Figure 1:
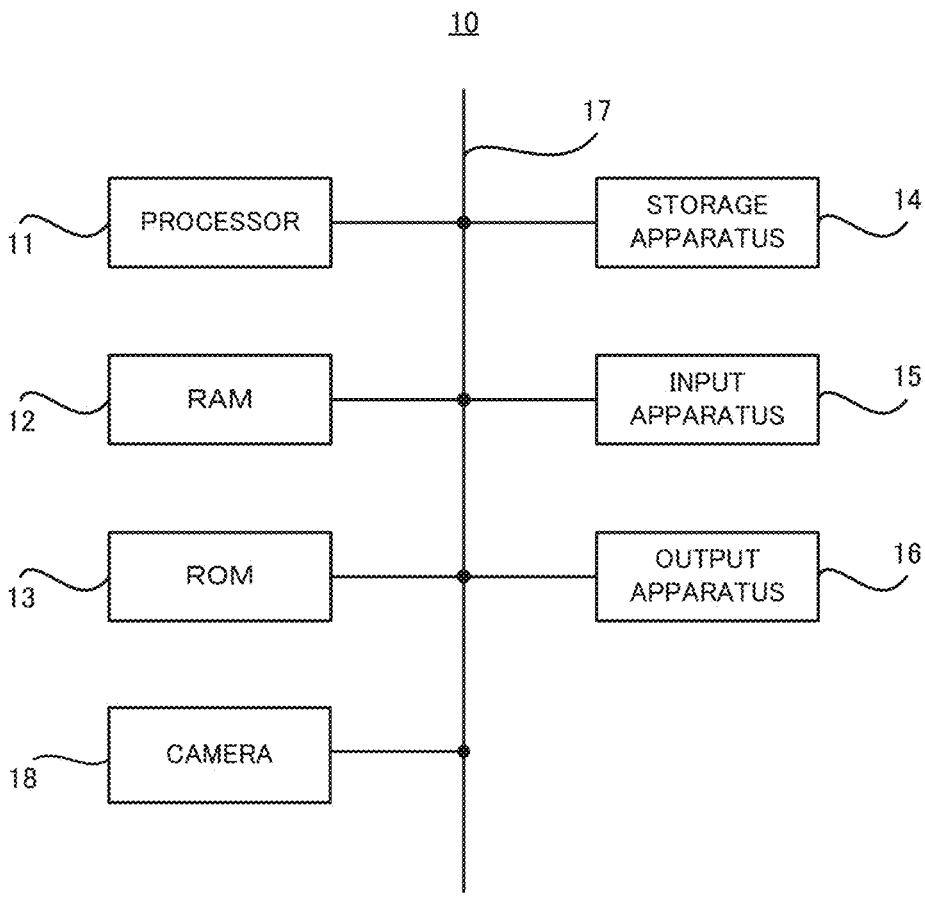
FIG. 1 is a block diagram illustrating a hardware configuration of an information processing system according to a first example embodiment.

An information processing system according to a first example embodiment will be described with reference to FIG. 1 to FIG. 3.
(Hardware Configuration)
First, a hardware configuration of the information processing system according to the first example embodiment will be described with reference to FIG. 1. FIG. 1 is a block diagram illustrating the hardware configuration of the information processing system according to the first example embodiment.

As illustrated in FIG. 1, an information processing system 10 according to the first example embodiment includes a processor 11, a RAM (Random Access Memory) 12, a ROM (Read Only Memory) 13, and a storage apparatus 14. The information processing system 10 may further include an input apparatus 15 and an output apparatus 16. Furthermore, the information processing system 10 includes a camera 18. The processor 11, the RAM 12, the ROM 13, the storage apparatus 14, the input apparatus 15, the output apparatus 16, and the cameras 18 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the information processing system 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for capturing an image of a target is realized or implemented in the processor 11. That is, the processor 11 may function as a controller for executing each control of the information processing system 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores data that are temporarily used by the processor 11 when the processor 11 executes the computer program. The RAM 12 may be, for example, a D-RAM (Dynamic Random Access Memory) or a SRAM (Static Random Access Memory). Furthermore, another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Furthermore, another type of nonvolatile memory may also be used instead of the ROM 13.

The storage apparatus 14 stores data that are stored by the information processing system 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing system 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the information processing system 10 to the outside. For example, the output apparatus 16 may be a display apparatus (e.g., a display) that is configured to display the information about the information processing system 10. The output apparatus 16 may be a speaker or the like that is configured to audio-output the information about the information processing system 10. The output apparatus 16 may be configured as a portable terminal such as a smartphone and a tablet. The output apparatus 16 may be an apparatus that outputs information in a form other than an image. For example, the output apparatus 16 may be a speaker that audio-outputs the information about the information processing system 10.

The camera 18 is a camera disposed at a position where an image of a target can be captured. The target herein is not limited to a human being, but may include an animal such as a dog, a cat, a snake, and a bird, and a robot, or the like. The camera 18 may capture an entire image of the target, or may image a part of the target. The camera 18 may be a camera that captures a still image, or a camera that captures a video. The camera 18 may be configured as a visible light camera or as a near infrared camera. A plurality of cameras 18 may be also provided. In that case, the plurality of cameras 18 may be of the same type, or of different types. For example, the camera 18 may have a function of automatically turning off when not capture an image. In this case, for example, a part having a short life such as a motor, may be preferentially turned off.

Especially, the camera 18 according to present example embodiment is configured to control a focal length. For example, the camera 18 is configured to increase or reduce the focal length. A specific configuration for controlling the focal length of the camera 18 will be described in detail in another example embodiment later.

Although FIG. 1 illustrates an example of the information processing system 10 including a plurality of apparatuses, all or a part of the functions thereof may be realized or implemented in a single apparatus (information processing apparatus). The information processing apparatus may include only the processor 11, the RAM 12, the ROM 13, and the camera 18. The other components (i.e., the storage apparatus 14, the input apparatus 15, and the output apparatus 16) may be provided in an external apparatus connected to the information processing apparatus, for example. In addition, in the information processing apparatus, a part of an arithmetic function may be realized by an external apparatus (e.g., an external server or cloud, etc.).

(Functional Configuration)

Next, with reference to FIG. 2, a functional configuration of the information processing system 10 according to the first example embodiment will be described. FIG. 2 is a block diagram illustrating the functional configuration of the information processing system according to the first example embodiment.

The information processing system 10 according to the first example embodiment is configured as a system that captures the image of the target. For example, the information processing system 10 may be configured as a system that captures an iris image or a face image of the target. The application of the image captured by the information processing system 10 is not particularly limited, but the image may be used in biometric authentication, for example. For example, the information processing system 10 may be configured as a part of a system that performs the biometric authentication by imaging a walking target (a so-called walk-through authentication system).

Figure 2:
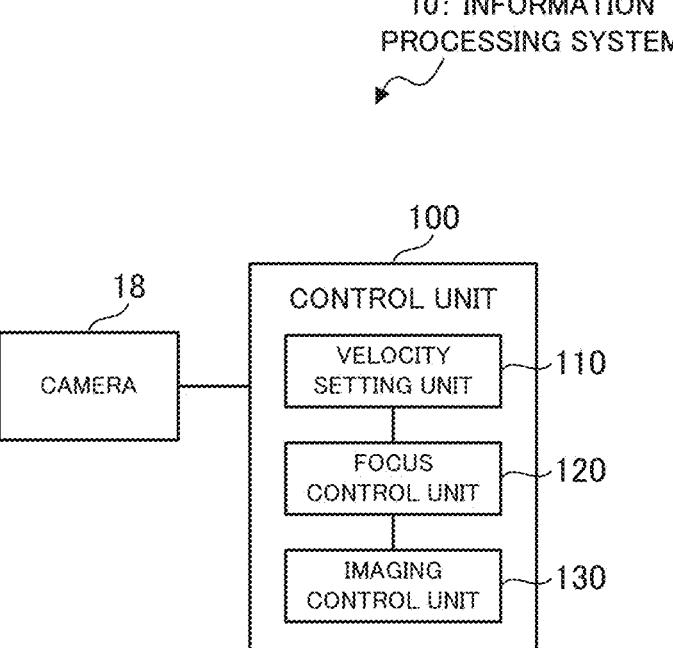
FIG. 2 is a block diagram illustrating a functional configuration of the information processing system according to the first example embodiment.

As illustrated in FIG. 2, the information processing system 10 according to the first example embodiment includes, as components for realizing the functions thereof, the camera 18 already described and a control unit 100. The control unit 100 is provided as a controller for controlling the camera 18, and includes a velocity setting unit 110, a focus control unit 120, and an imaging control unit 130. Each of the velocity setting unit 110, the focus control unit 120, and the imaging control unit 130 may be a processing block realized or implemented by the processor 11 (see FIG. 1), for example.

The velocity setting unit 110 is configured to set a focus change velocity that is a velocity for changing the focal length of the camera 18. The velocity setting unit 110 sets the focus change velocity on the basis of at least one of information about the target to be imaged by the camera 18, and information about the camera 18. At this time, the velocity setting unit 110 may use a plurality of pieces of information about the target and a plurality of pieces of information about the camera 18.

An example of the information about the target includes a position of the target, a moving velocity of the target, a height of the target, or the like. An example of the information about the camera 18 includes camera parameters such as an exposure time and a depth of field, and information indicating various specifications of the camera. The information about the target may be acquired from the image captured by the camera 18, or may be acquired by using various other sensors. On the other hand, the information about the camera 18 may be automatically acquired by communicating with the camera 18. Alternatively, the information about the target and the information about the camera 18 may be manually inputted by the user (e.g., a system manager/administrator, etc.).

The focus control unit 120 is configured to control the focal length of the camera 18. Specifically, the focus control unit 120 is configured to change the focal length of the camera a plurality of times at the focus change velocity set by the velocity setting unit 110. For example, the focus control unit 120 may control the focal length of the camera 18 to be increase or reduced at high speed. A specific control example by the focus control unit 120 will be described in detail in another example embodiment later.

The imaging control unit 130 is configured to control the camera 18 to image the target. Furthermore, the imaging control unit 130 according to the present example embodiment is especially configured to control the camera 18 to perform imaging with a first focal length and a second focal length that is different from the first focal length. More specifically, the imaging control unit 130 may control the camera 18 to perform imaging in timing when the focal length of the camera 18 becomes the first focal length by the control by the focus control unit 120, and then to perform imaging in timing when the focal length of the camera 18 becomes the second focal length by the control by the focus control unit 120. The imaging control unit 130 may control the camera 18 to perform imaging while changing the focal length, or to temporarily stop a change in the focal length in imaging timing (i.e., the timing when the focal length becomes the first focal length, and the timing when the focal length becomes the second focal length) and perform imaging. As a consequence, a plurality of images of the target are captured at different focal lengths.

(Flow of Operation)

Next, with reference to FIG. 3, a flow of operation of the information processing system 10 according to the first example embodiment will be described. FIG. 3 is a flowchart illustrating the flow of the operation of the information processing system according to the first example embodiment.

Figure 3:
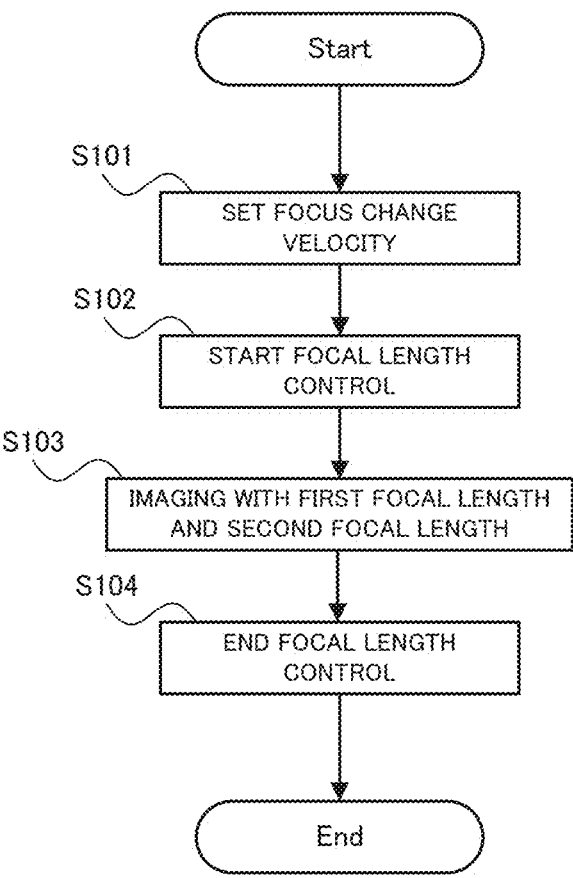
FIG. 3 is a flowchart illustrating a flow of operation of the information processing system according to the first example embodiment.

As illustrated in FIG. 3, when the operation of the information processing system 10 according to the first example embodiment is started, first, the velocity setting unit 110 sets the focus change velocity on the basis of at least one of the information about the target and the information about the camera 18 (step S101). The focus change velocity set by the velocity setting unit 110 is outputted to the focus control unit 120.

Subsequently, the focus control unit 120 starts a control for changing the focal length of the camera 18 at the focus change velocity set by the velocity setting unit 110 (step S102). Then, the imaging control unit 130 controls the camera 18 to perform imaging with the first focal length and the second focal length (step S103). Here, it is exemplified that the imaging is performed with two focal lengths that are the first focal length and the second focal length, but the imaging may be performed with three or more focal lengths. That is, the imaging may be performed with a third focal length or a fourth focal length. The number of times of imaging may be set in advance, or may be set in accordance with the circumstances. For example, the imaging control unit 130 may control the camera 18 to perform imaging repeatedly, while the target is in a range where the target can be imaged.

Thereafter, the focus control unit 120 ends the control for changing the focal length of the camera 18 (step S104). For example, the focus control unit 120 may end the control for changing the focal length in timing when the imaging by the imaging control unit 130 is ended. Alternatively, the focus control unit 120 may end the control after a lapse of a predetermined period from a start of the control for changing the focal length.

(Technical Effect)

Next, a technical effect obtained by the information processing system 10 according to the first example embodiment will be described.

As described in FIG. 1 to FIG. 3, in the information processing system 10 according to the first example embodiment, the focal length of the camera 18 is controlled to change a plurality of times, and the image of the target is captured with the first focal length and the second focal length. In this way, it is possible to increase a possibility that a image in focus is captured, as compared with a case where the imaging is performed without changing (i.e., fixing) the focal length of the camera 18. Therefore, it is possible to capture a high-quality image in focus even in a situation where an image in focus is hardly captured (e.g., when the imaging is performed by a camera with a low depth of field, or when a moving target is imaged).

Second Example Embodiment

The information processing system 10 according to a second example embodiment will be described with reference to FIG. 4 to FIG. 6. The second example embodiment is partially different from the first example embodiment only in the operation, and may be the same as the first example embodiment in the other parts. For this reason, a part that is different from the first example embodiment will be described in detail below, and a description of the other overlapping parts will be omitted as appropriate.

(Focus Control Operation)

First, with reference to FIG. 4, a flow of an operation for controlling the focal length (hereinafter referred to as a "focus control operation" as appropriate) by the information processing system 10 according to the second example embodiment will be described. FIG. 4 is a flowchart illustrating the flow of the focus control operation by the information processing system according to the second example embodiment.

Figure 4:
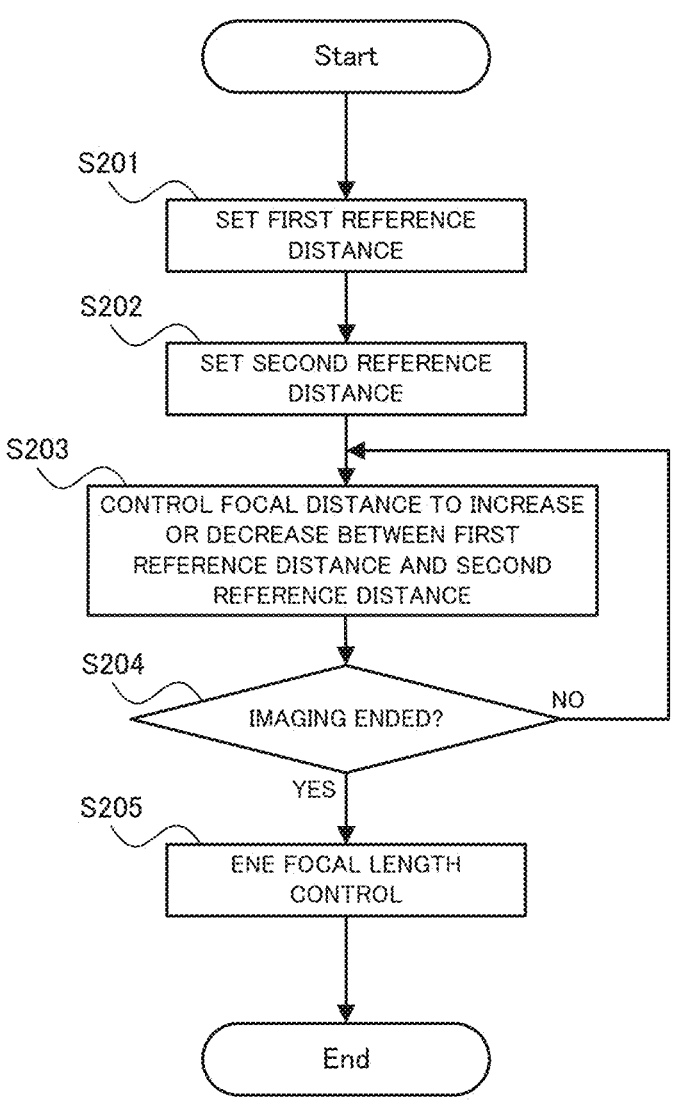
FIG. 4 is a flowchart illustrating a flow of a focus control operation by an information processing system according to a second example embodiment.

As illustrated in FIG. 4, when the focus control operation by the information processing system 10 according to the second example embodiment is started, first, the focus control unit 120 sets a first reference distance (step S201). Furthermore, the focus control unit 120 sets a second reference distance (step S202). The first reference distance and the second reference distance here have values corresponding to an upper limit and a lower limit in controlling the focal length. In the following, a section between the first reference distance and the second reference distance is referred to as a "predetermined section". The focus control unit 120 may set the first reference distance and the second reference distance by reading a value set in advance, for example. Alternatively, the focus control unit 120 may set the first reference distance and the second reference distance on the basis of the information about the target or the like. A specific example of setting the first reference distance and the second reference distance will be described in detail in another example embodiment later.

Subsequently, the focus control unit 120 controls the focal length of the camera 18 to increase or decrease between the set first reference distance and the set second reference distance (step S203). At this time, the focus control unit 120 controls the focal length to be changed at the focus change velocity set by the velocity setting unit 110. Such control of the focal length is performed a plurality of times. Therefore, the focal length of the camera 18 is repeatedly increased or reduce between the first reference distance and the second reference distance, and the image of the target is captured a plurality of times in such a condition. Specifically, the imaging is performed with the first focal length and the second focal length that are between the first reference distance and the second reference distance.

Thereafter, the focus control unit 120 determines whether or not the imaging by the imaging control unit 130 is ended (step S204). When the imaging by the imaging control unit 130 is not ended (the step S204: NO), the focus control unit 120 continues to control the focal length. On the other hand, when the imaging by the imaging control unit 130 is ended (the step S204: YES), the focus control unit 120 ends the control of the focal length (step S205).

(Specific Control Example)

Next, with reference to FIG. 5 and FIG. 6, a specific control example of the focus control operation by the information processing system 10 according to the second example embodiment will be described in detail, including a comparative example. FIG. 5 is a graph illustrating a relation between the focal length and the target position in an information processing system according to the comparative example. FIG. 6 is a graph illustrating a relation between the focal length and the target position in the information processing system according to the second example embodiment.

Figure 5:
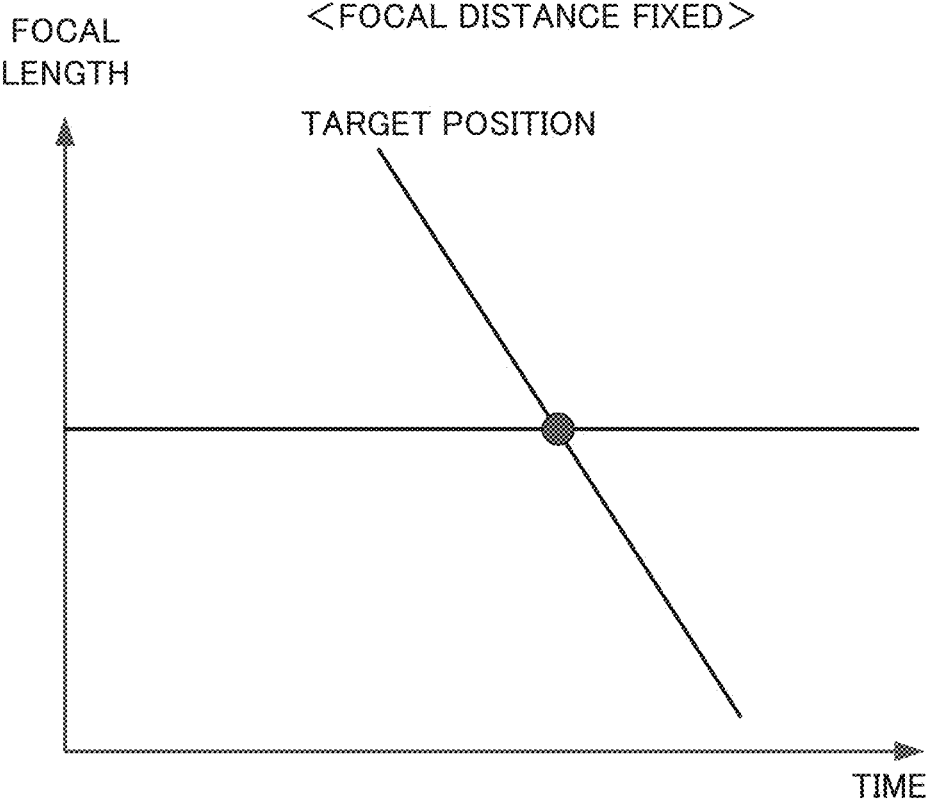
FIG. 5 is a graph illustrating a relation between a focal length and a target position in an information processing system according to a comparative example.

As illustrated in FIG. 5, considered is a comparative example of imaging with the focal length fixed (i.e., the focal length is not controlled as in the present example embodiment). In such a comparative example, for example, it is only once that the target position intersects the fixed focal length in a situation where the target approaches the camera. Therefore, it is only once that an image in focus can be captured by the camera 18.

Figure 6:
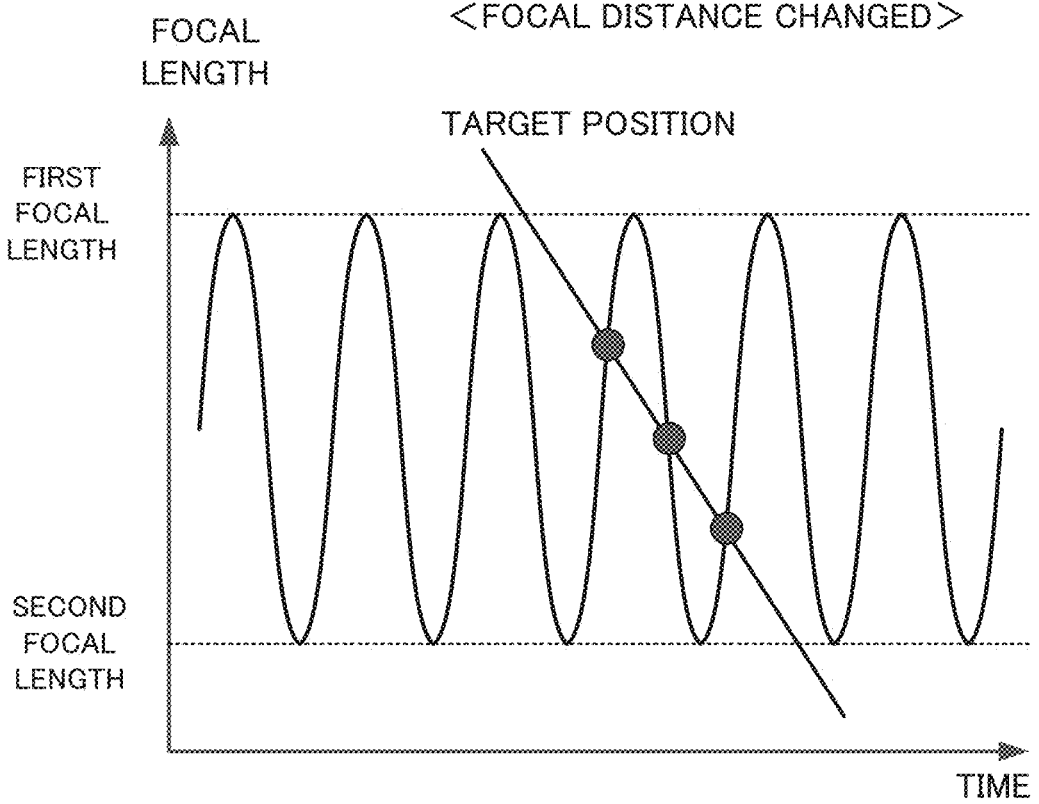
FIG. 6 is a graph illustrating a relation between the focal length and the target position in the information processing system according to the second example embodiment.

Meanwhile, as illustrated in FIG. 6, when the focal length is increased or reduced between the first reference distance and the second reference distance, the target position intersects the focal length a plurality of times. Therefore, it is a plurality of times that the image in focus can be captured by the camera 18. This increases an opportunity in which the image in focus can be captured by the camera 18, as compared with the above-described comparative example.

(Technical Effect)

Next, a technical effect obtained by the information processing system 10 according to the second example embodiment will be described.

As described in FIG. 4 to FIG. 6, in the information processing system 10 according to the second example embodiment, the focal length of the camera 18 is controlled to increase or decrease between the first reference distance and the second reference distance. In this way, it is possible to increase the possibility that the image in focus is captured. The opportunity in which the image in focus can be captured, may be efficiently increased by properly setting the first reference distance and the second reference distance. A method of setting the first reference distance and the second reference distance will be described in detail in another example embodiment later.

Third Example Embodiment

The information processing system 10 according to a third example embodiment will be described with reference to FIG. 7 to FIG. 9. The third example embodiment is partially different from the first and second example embodiments only in the operation, and may be the same as the first and second example embodiments in the other parts. For this reason, a part that is different from each of the example embodiments described above will be described in detail below, and a description of the other overlapping parts will be omitted as appropriate.

(Focus Control Operation)

First, with reference to FIG. 7, a flow of the focus control operation by the information processing system 10 according to the third example embodiment will be described. FIG. 7 is a flowchart illustrating the flow of the focus control operation by the information processing system according to the third example embodiment. In FIG. 7, the same steps as those illustrated in FIG. 4 carry the same reference numerals.

Figure 7:
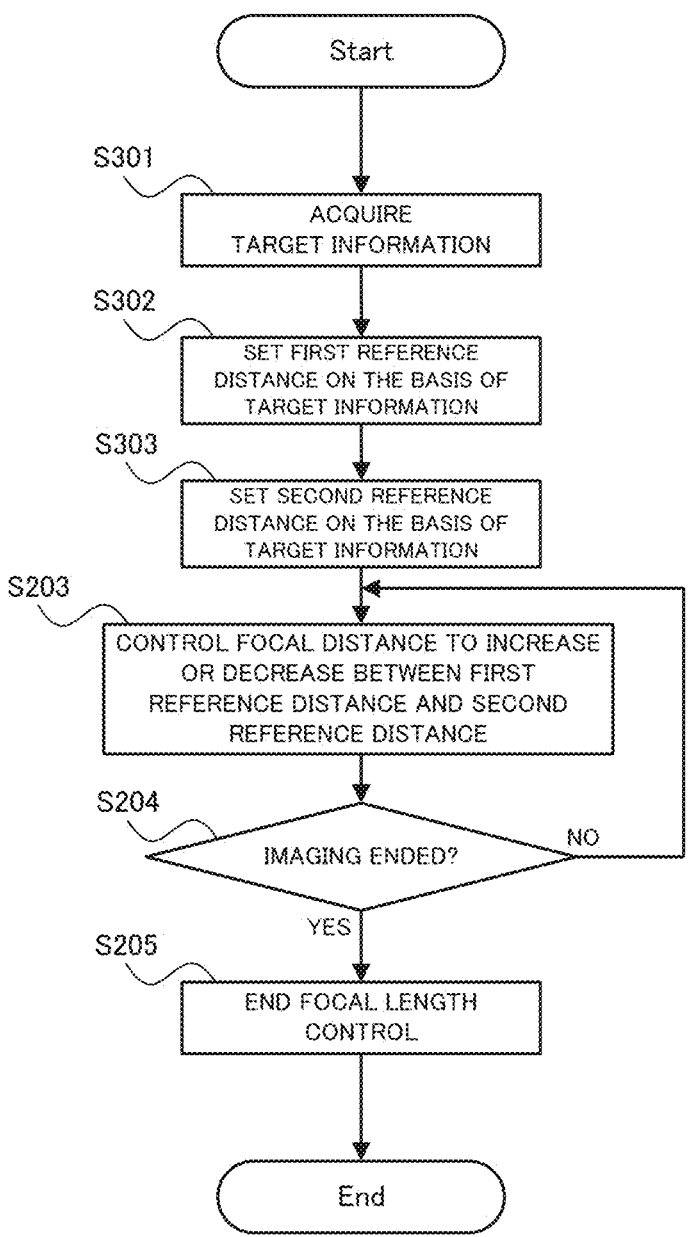
FIG. 7 is a flowchart illustrating a flow of the focus control operation by an information processing system according to a third example embodiment.

As illustrated in FIG. 7, when the focus control operation by the information processing system 10 according to the third example embodiment is started, first, the focus control unit 120 acquires the information about the target (hereinafter referred to as "target information" as appropriate) (step S301). The target information may be information used when the velocity setting unit 110 sets the focus change velocity, or may be another type of information. The target information may be, for example, the position of the target or the velocity of the target.

Subsequently, the focus control unit 120 sets the first reference distance on the basis of the target information (step S302). Furthermore, the focus control unit 120 sets the second reference distance on the basis of the target information (step S303). Then, the focus control unit 120 controls the focal length of the camera 18 to increase or decrease between the set first reference distance and the set second reference distance (step S203). At this time, the focus control unit 120 controls the focal length to be changed at the focus change velocity set by the velocity setting unit 110.

Thereafter, the focus control unit 120 determines whether or not the imaging by the imaging control unit 130 is ended (step S204). When the imaging by the imaging control unit 130 is not ended (the step S204: NO), the focus control unit 120 continues to control the focal length. On the other hand, when the imaging by the imaging control unit 130 is ended (the step S204: YES), the focus control unit 120 ends the control of the focal length (step S205).

(Specific Control Example)

Next, a specific control example of the focus control operation by the information processing system 10 according to the third example embodiment will be described with reference to FIG. 8 and FIG. 9. FIG. 8 is a graph illustrating an example of changing the first reference distance and the second reference distance to widen the predetermined section. FIG. 9 is a graph illustrating an example of changing the first reference distance and the second reference distance to narrow the predetermined section.

Figure 8:
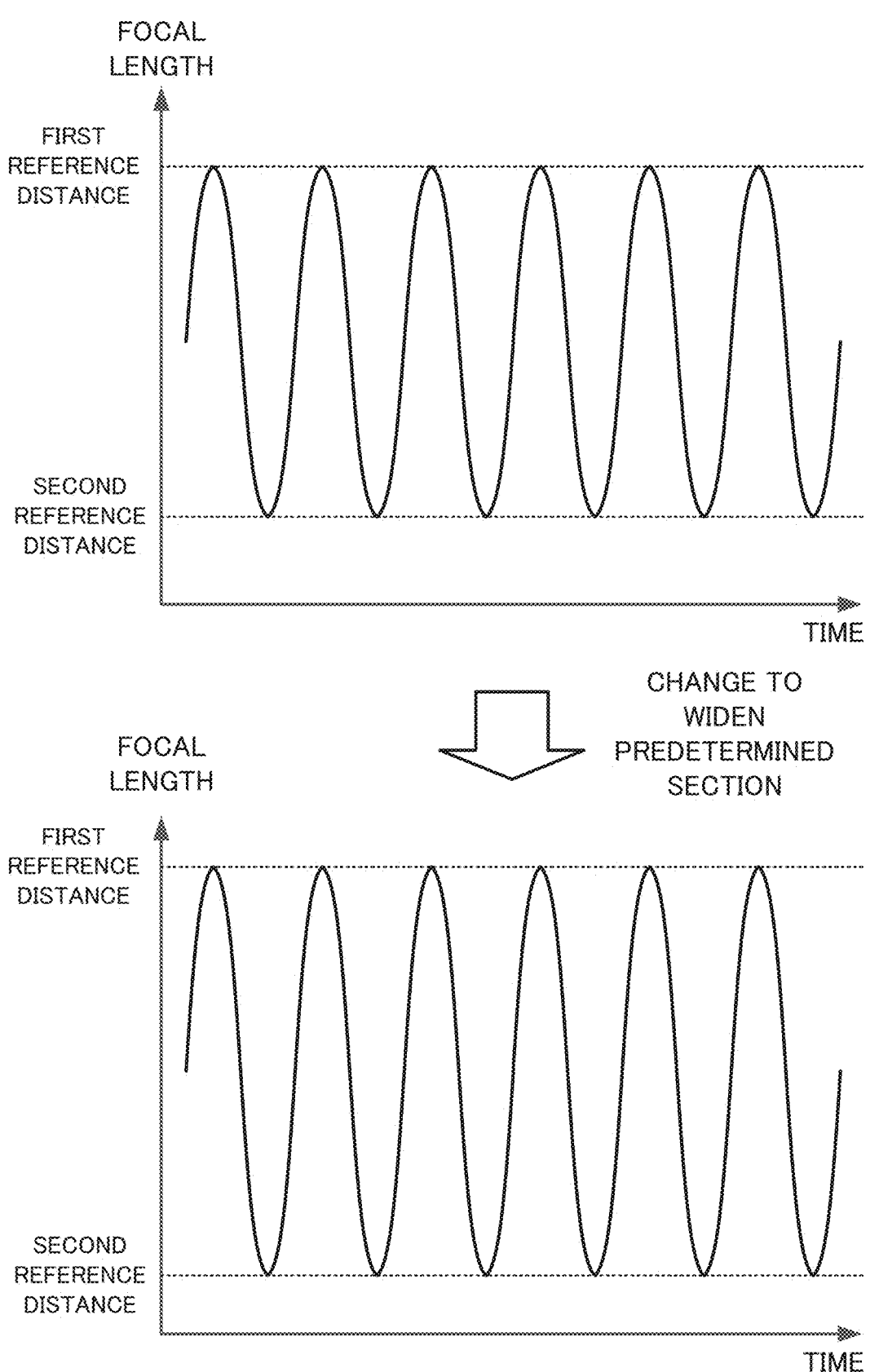
FIG. 8 is a graph illustrating an example of changing a first reference distance and a second reference distance to widen a predetermined section.

As illustrated in FIG. 8, the focus control unit 120 may change the first reference distance and the second reference distance to widen the predetermined section in accordance with the target information. For example, the focus control unit 120 may change the first reference distance and the second reference distance to widen the predetermined section when the target is far from the camera 18, or when the velocity of the target is low: The focus control unit 120, for example, further increases the first reference distance that is the upper limit value of the predetermined section, while further reducing the second reference distance that is the lower limit value of the predetermined section. At this time, a change amount of the first reference distance and the second reference distance may be a fixed value, or may be determined on the basis of the target information. Although described here is an example of changing both the first reference distance and the second reference distance, only one of the first reference distance and the second reference distance may be also changed. For example, the predetermined section may be widened by increasing the first reference distance, with the second reference distance fixed. Alternatively, the predetermined section may be widened by reducing only the second reference distance, with the first reference distance fixed.

Figure 9:
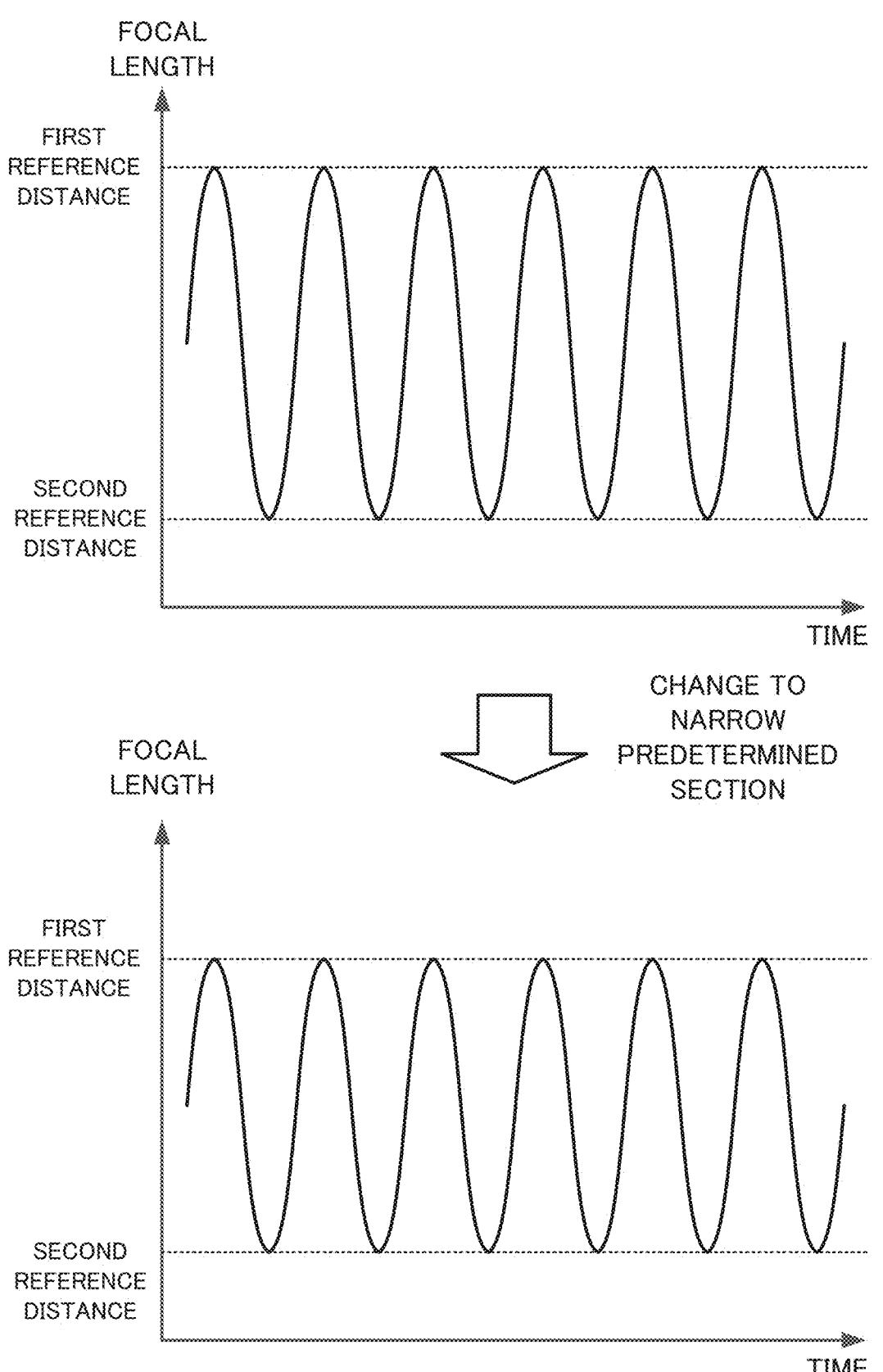
FIG. 9 is a graph illustrating an example of changing the first reference distance and the second reference distance to narrow the predetermined section.

As illustrated in FIG. 9, the focus control unit 120 may change the first reference distance and the second reference distance to narrow the predetermined section in accordance with the target information. For example, the focus control unit 120 may change the first reference distance and the second reference distance to narrow the predetermined section, when the target is close to the camera 18, or when the velocity of the target is high. The focus control unit 120, for example, further reduces the first reference distance that is the upper limit value of the predetermined section, while further increasing the second reference distance that is the lower limit value of the predetermined section. At this time, the change amounts of the first reference distance and the second reference distance may be fixed values, or may be determined on the basis of the target information. Although described here is an example of changing both the first reference distance and the second reference distance, only one of the first reference distance and the second reference distance may be also changed. For example, the predetermined section may be narrowed by reducing only the first reference distance, with the second reference distance fixed. Alternatively, the predetermined section may be narrowed by increasing only the second reference distance, with the first reference distance fixed.

(Technical Effect)

Next, a technical effect obtained by the information processing system 10 according to the third example embodiment will be described.

As described in FIG. 7 to FIG. 9, in the information processing system 10 according to the third example embodiment, the predetermined section (i.e., the first reference distance and the second reference distance) is changed on the basis of the target information. In this way, the predetermined section can be properly set in accordance with a state of the target, and it is thus possible to efficiently increase the possibility that the image in focus is captured.

Modified Example of Third Example Embodiment

The information processing system 10 according to a modified example of the third example embodiment will be described with reference to FIG. 10 and FIG. 11. The modified example of the third example embodiment is partially different from the third example embodiment only in the operation, and may be the same as the first to third example embodiments in the other parts. For this reason, a part that is different from each of the example embodiments described above will be described in detail below, and a description of the other overlapping parts will be omitted as appropriate.

(Focus Control Operation)

First, with reference to FIG. 10, a flow of the focus control operation by the information processing system 10 according to the modified example of the third example embodiment will be described. FIG. 10 is a flowchart illustrating the flow of the focus control operation by the information processing system according to the modified example of the third example embodiment. In FIG. 10, the same steps as those illustrated in FIG. 7 carry the same reference numerals.

Figure 10:
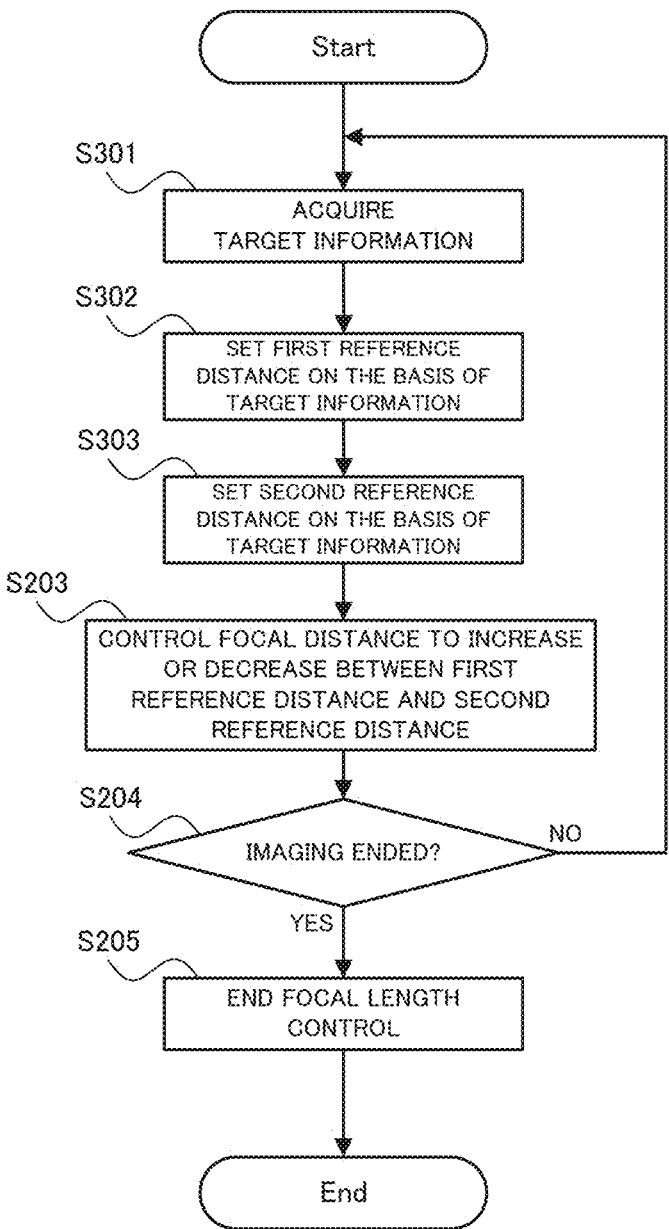
FIG. 10 is a flowchart illustrating a flow of the focus control operation by an information processing system according to a modified example of the third example embodiment.

As illustrated in FIG. 10, when the focus control operation by the information processing system 10 according to a modified example of the third example embodiment is started, first, the focus control unit 120 acquires the information about the target (hereinafter referred to as "target information" as appropriate) (step S301).

Subsequently, the focus control unit 120 sets the first reference distance on the basis of the target information (step S302). Furthermore, the focus control unit 120 sets the second reference distance on the basis of the target information (step S303). Then, the focus control unit 120 controls the focal length of the camera 18 to increase or decrease between the set first reference distance and the set second reference distance (step S203). At this time, the focus control unit 120 controls the focal length to be changed at the focus change velocity set by the velocity setting unit 110.

Thereafter, the focus control unit 120 determines whether or not the imaging by the imaging control unit 130 is ended (step S204). When the imaging by the imaging control unit 130 is ended (the step S204: YES), the focus control unit 120 ends the control of the focal length (step S205). On the other hand, when the imaging by the imaging control unit 130 is not ended (the step S204: NO), the focus control unit 120 repeats the processing from the step S301. Therefore, the focus control unit 120 newly acquires the target information, and sets the first reference distance and the second reference distance again. Then, the focus control unit 120 controls the focal length on the basis of the newly set first reference distance and the newly set second reference distance.

As described above, in the information processing system 10 according to the modified example of the third example embodiment, the first reference distance and the second reference distance are not fixed, and change in accordance with target information at that time. Such a change in the first reference distance and the second reference distance may be performed, for example, in a period in which the imaging is performed.

(Specific Control Example)

Next, with reference to FIG. 11, a specific control example of the focus control operation by the information processing system 10 according to the modified example of the third example embodiment will be described. FIG. 11 is a graph illustrating an example of changing the first reference distance and the second reference distance to change the predetermined section in accordance with the target position.

Figure 11:
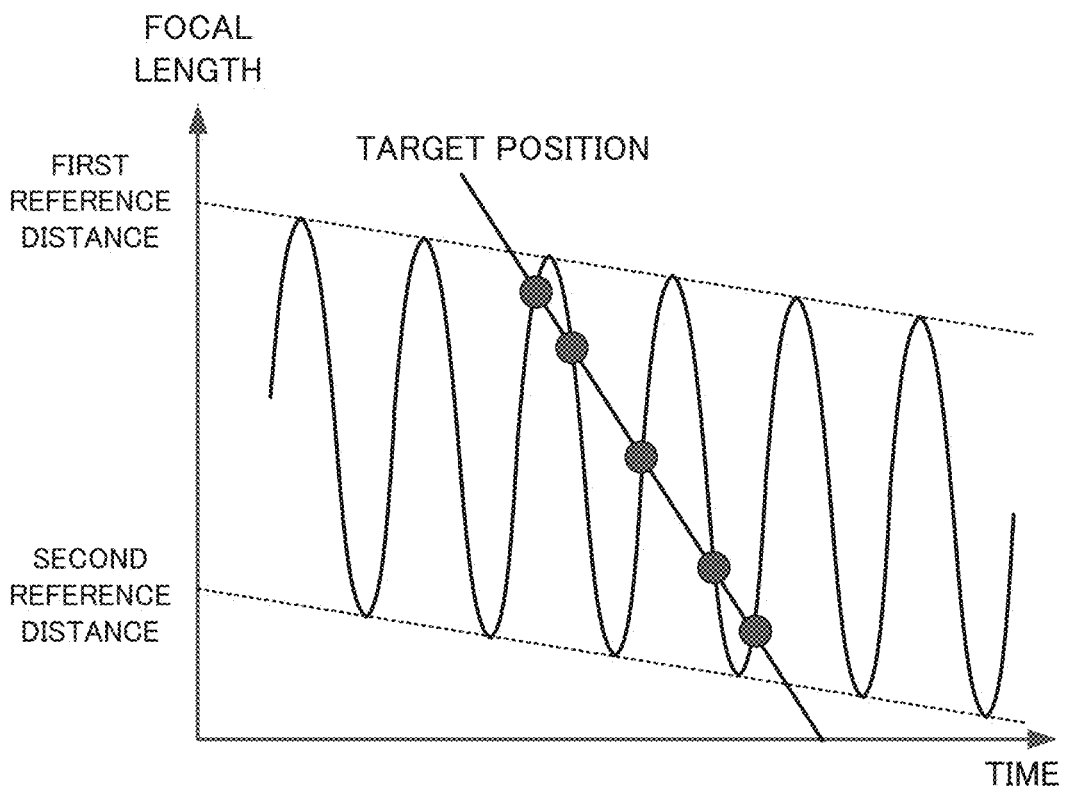
FIG. 11 is a graph illustrating an example of changing the first reference distance and the second reference distance to change the predetermined section in accordance with the target position.

As illustrated in FIG. 11, the focus control unit 120 may gradually reduce the first reference distance and the second reference distance. In this case, the predetermined section is changed to gradually move downward. Alternatively, the focus control unit 120 may gradually increase the first reference distance and the second reference distance. In this case, the predetermined section is changed to gradually move upward.

Although described here is an example in which a width of the predetermined section (i.e., a difference between the first reference distance and the second reference distance) does not change, the width of the predetermined section may change on the basis of the target information. For example, the focus control unit 120 may perform a control to gradually narrow the predetermined section gradually. Alternatively, the focus control unit 120 may perform a control to gradually widen the predetermined section. Alternatively, the focus control unit 120 may perform a control to narrow or widen the predetermined section. For example, the predetermined section that is gradually narrowed, may be controlled to be wider in the middle. Conversely, the predetermined section that is gradually widened, may be controlled to be narrowed in the middle.

Furthermore, the focus control unit 120 may change only one of the first reference distance and the second reference distance. For example, the focus control unit 120 may gradually reduce the first reference distance, while not changing the second reference distance (with it fixed) after initial settings. Alternatively, the focus control unit 120 may gradually increase the second reference distance, while not changing the first reference distance (with it fixed) after initial settings.

(Technical Effect)

Next, a technical effect obtained by the information processing system 10 according to a modified example of the third example embodiment will be described.

As described in FIG. 10 and FIG. 11, in the information processing system 10 according to the modified example of the third example embodiment, the predetermined section (i.e., the first reference distance and the second reference distance) is changed as required in accordance with the target information. In this way, the predetermined section can be properly set in accordance with the state of the target, and it is thus possible to more efficiently increase the possibility that the image in focus is captured, as compared with a case where the first reference distance and the second reference distance are fixed at initially set values.

Fourth Example Embodiment

The information processing system 10 according to a fourth example embodiment will be described with reference to FIG. 12 and FIG. 13. The fourth example embodiment is partially different from the third example embodiment only in the operation, and may be the same as the first to third example embodiments in the other parts. For this reason, a part that is different from each of the example embodiments described above will be described in detail below, and a description of the other overlapping parts will be omitted as appropriate.

(Focus Control Operation)

First, with reference to FIG. 12, a flow of the focus control operation by the information processing system 10 according to the fourth example embodiment will be described. FIG. 12 is a flowchart illustrating the flow of the focus control operation by the information processing system according to the fourth example embodiment. In FIG. 12, the same steps as those illustrated in FIG. 4 carry the same reference numerals. In addition, the following operation assumes a situation where the target gradually approaches the camera 18.

Figure 12:
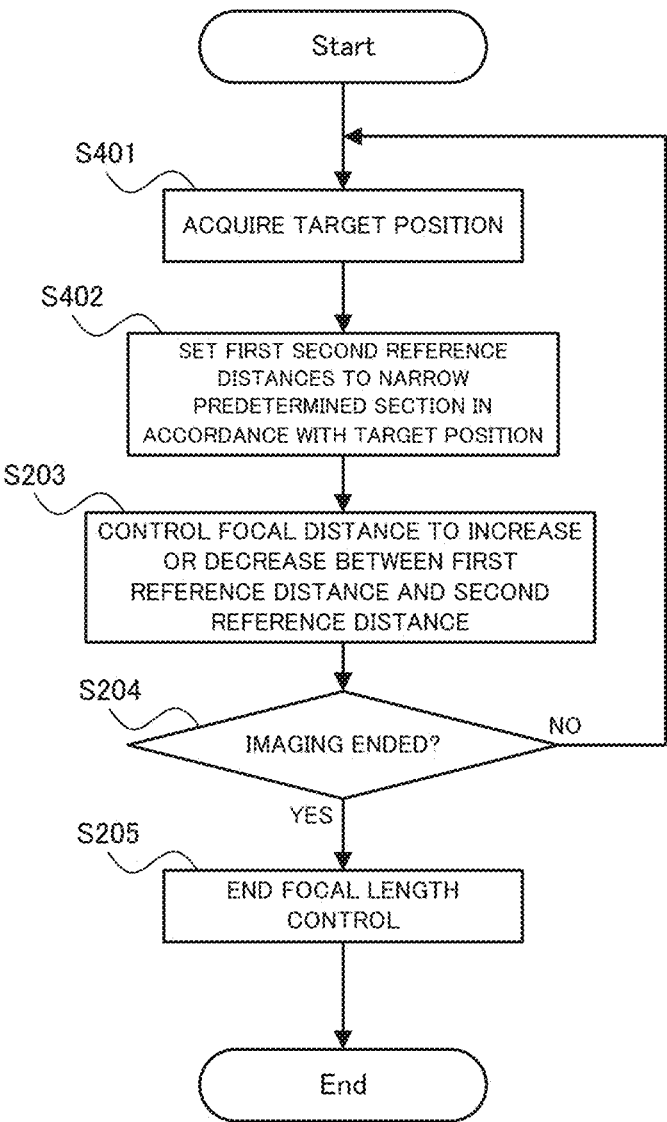
FIG. 12 is a flowchart illustrating a flow of the focus control operation by an information processing system according to a fourth example embodiment.

As illustrated in FIG. 12, when the focus control operation by the information processing system 10 according to the fourth example embodiment is started, first, the focus control unit 120 acquires the target position (step S401). The target position may be acquired from the image captured by the camera 18, or may be acquired by various other sensors, for example.

Subsequently, the focus control unit 120 sets the predetermined section based on the acquired target position. Specifically, the focus control unit 120 sets the first reference distance and the second reference distance such that the predetermined section is narrower as the target position is closer to the camera 18 (step S402). Then, the focus control unit 120 controls the focal length of the camera 18 to increase or decrease between the set first reference distance and the set second reference distance (step S203). At this time, the focus control unit 120 controls the focal length to be changed at the focus change velocity set by the velocity setting unit 110.

Thereafter, the focus control unit 120 determines whether or not the imaging by the imaging control unit 130 is ended (step S204). When the imaging by the imaging control unit 130 is ended (the step S204: YES), the focus control unit 120 ends the control of the focal length (step S205). On the other hand, when the imaging by the imaging control unit 130 is not ended (the step S204: NO), the focus control unit 120 repeats the processing from the step S301. Therefore, the focus control unit 120 newly acquires the target position, and sets the first reference distance and the second reference distance again.

Since the target gradually approaches the camera 18, the predetermined section to be newly set is narrower than the predetermined section set so far. As described above, in the information processing system according to the fourth example embodiment, the control is performed such that the predetermined section becomes gradually narrower as the target approaches the camera.

(Specific Control Example)

Next, with reference to FIG. 13, a specific control example of the focus control operation by the information processing system 10 according to the fourth example embodiment will be described. FIG. 13 is a graph illustrating an example of changing the first reference distance and the second reference distance such that the predetermined section becomes narrower as the target approaches the camera.

Figure 13:
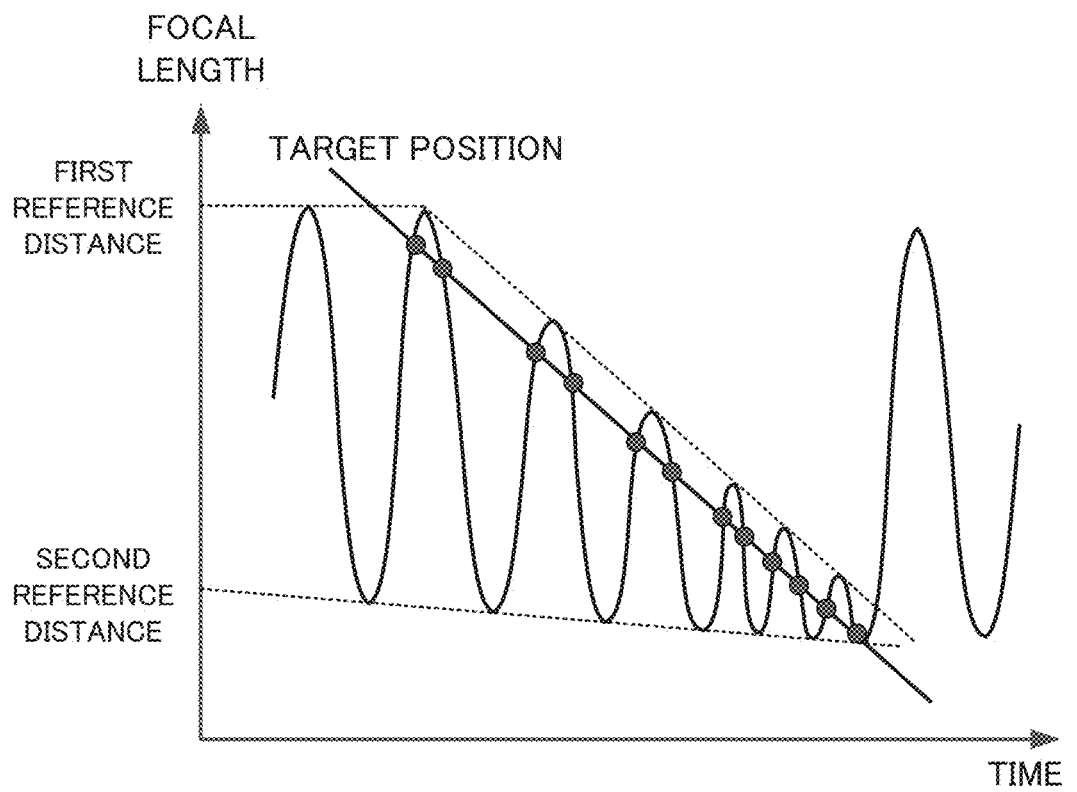
FIG. 13 is a graph illustrating an example of changing the first reference distance and the second reference distance such that the predetermined section becomes narrower as a target approaches a camera.

As illustrated in FIG. 13, the focus control unit 120 sets the first reference distance and the second reference distance such that the predetermined section becomes narrower as the target approaches the camera 18. More specifically, the focus control unit 120 sets the first reference distance and the second reference distance such that the target position is within the predetermined section, and that the focal length is changed to follow the target position. As illustrated in FIG. 13, after the imaging of the target is ended, the first reference distance and the second reference distance may be returned to initial values.

(Technical Effect)

Next, a technical effect obtained by the information processing system 10 according to the fourth example embodiment will be described.

As described in FIG. 12 and FIG. 13, in the information processing system 10 according to the fourth example embodiment, the control is performed such that the predetermined section gradually becomes narrower as the target approaches the camera. In this way, the focal length is controlled to follow the position of the target, and it is thus possible to more efficiently increase the possibility that the image in focus is captured.

Fifth Example Embodiment

The information processing system 10 according to a fifth example embodiment will be described with reference to FIG. 14 and FIG. 15. The fifth example embodiment is partially different from the first to fourth example embodiments only in the operation, and may be the same as the first to fourth example embodiments in the other parts. For this reason, a part that is different from each of the example embodiments described above will be described in detail below; and a description of the other overlapping parts will be omitted as appropriate.

(Flow of Operation)

First, a flow of operation of the information processing system 10 according to the fifth example embodiment will be described with reference to FIG. 14. FIG. 14 is a flowchart illustrating the flow of the operation of the information processing system according to the fifth example embodiment. In FIG. 14, the same steps as those illustrated in FIG. 3 carry the same reference numerals.

Figure 14:
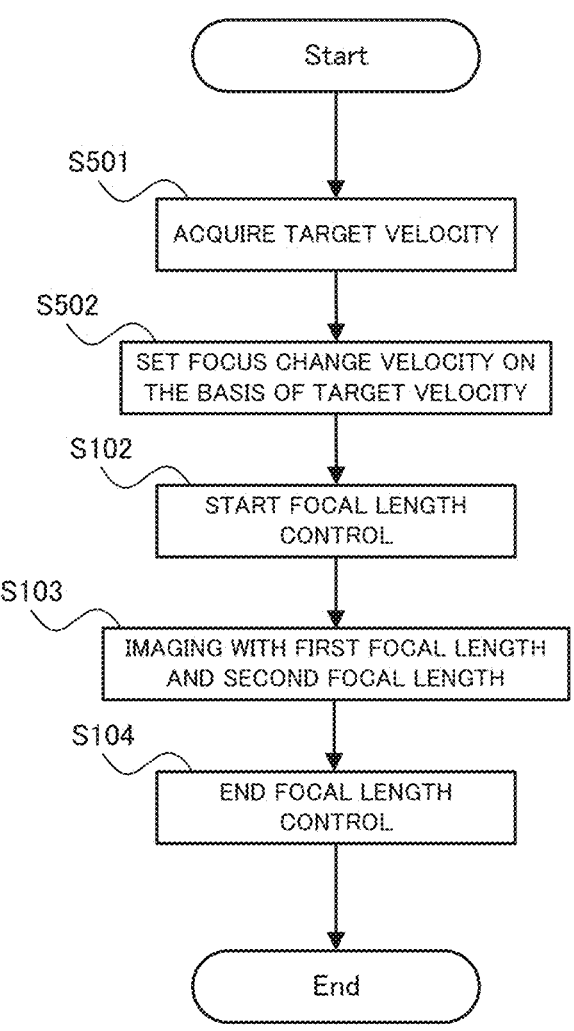
FIG. 14 is a flowchart illustrating a flow of operation of an information processing system according to a fifth example embodiment.

As illustrated in FIG. 14, when the operation of the information processing system 10 according to the fifth example embodiment is started, first, the velocity setting section 110 acquires a moving velocity of the target (hereinafter referred to as a "target velocity" as appropriate) (step S501). The target velocity may be acquired on the basis of the image captured by the camera 18, for example. More specifically, the target velocity may be estimated from a difference between a plurality of images. Alternatively, the target velocity may be detected by a velocity sensor or the like.

Subsequently, the velocity setting unit 110 sets the focus change velocity on the basis of the target velocity (step S502). For example, the velocity setting unit 110 may increase the focus change velocity as the target velocity increases. The velocity setting unit 110 may set the focus change velocity by using another piece of information in addition to the target velocity. The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103). Thereafter, the focus control unit 120 ends the control for changing the focal length of the camera 18 (step S104).

(Specific Setting Example)

Next, with reference to FIG. 15, a specific example of setting the focus change velocity by the information processing system 10 according to the fifth example embodiment will be described. FIG. 15 is a graph illustrating an example of setting the focus change velocity when the target velocity is low and when the target velocity is high.

Figure 15A:
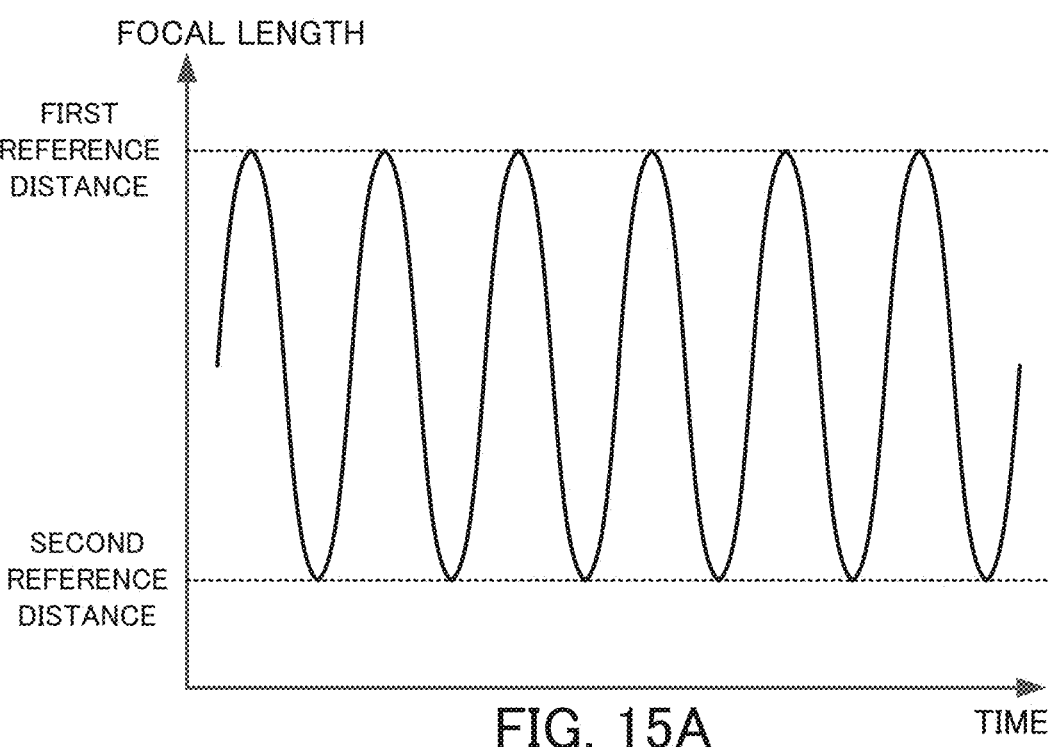
FIG. 15A is a graph illustrating an example of setting a focus change velocity when a target velocity is low and when the target velocity is high.
Figure 15B:
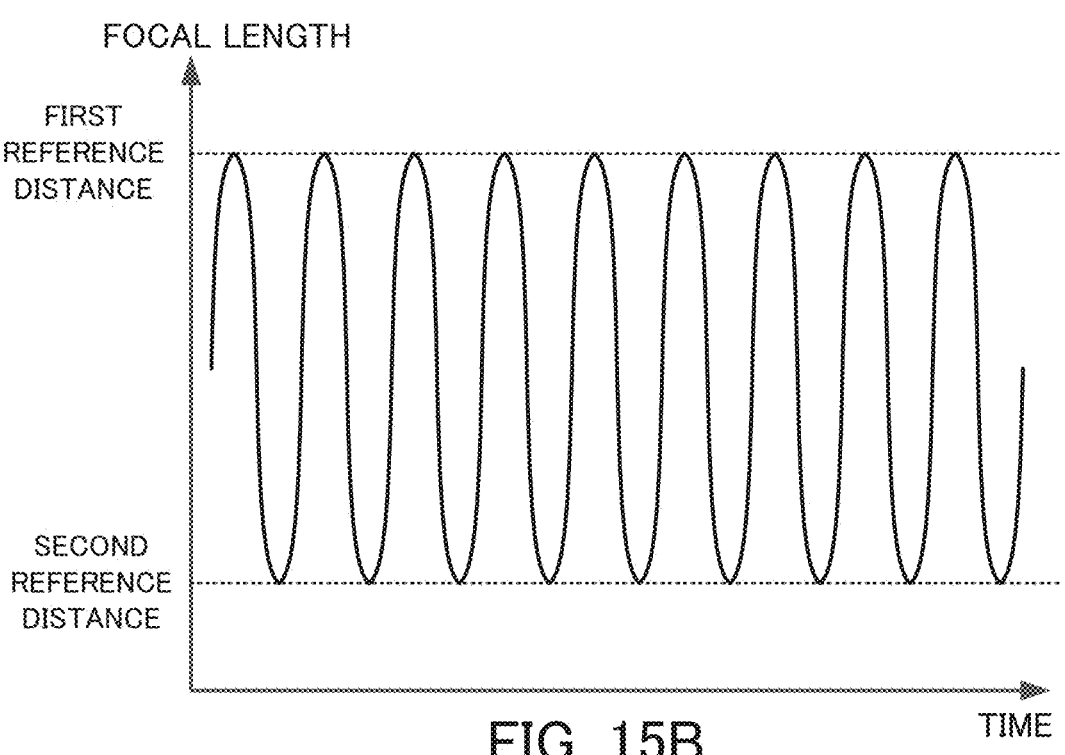
FIG. 15B is a graph illustrating an example of setting a focus change velocity when a target velocity is low and when the target velocity is high.

As illustrated in FIG. 15A, when the target velocity is low, the velocity setting unit 110 may set the focus change velocity to be low: Furthermore, as illustrated in FIG. 15B, when the target velocity is high, the velocity setting unit 110 may set the focus change velocity to be high. A relation between the target velocity and the focus change velocity may be set in advance by a map or the like. Alternatively, the focus change velocity may be calculated from the target velocity by using a predetermined equation. The focus change velocity is preferably set to such a velocity that the focal length reciprocates at least once between the first reference distance and the second reference distance, while the target passes through the predetermined section (i.e., between the first reference distance and the second reference distance).

(Technical Effect)

Next, a technical effect obtained by the information processing system 10 according to the fifth example embodiment will be described.

As described in FIG. 14 and FIG. 15, in the information processing system 10 according to the fifth example embodiment, the focus change velocity is set on the basis of the target velocity. In this way, the focal length is controlled at an appropriate velocity corresponding to the target velocity, and it is thus possible to efficiently increase the possibility that the image in focus is captured.

Sixth Example Embodiment

The information processing system 10 according to a sixth example embodiment will be described with reference to FIG. 16 and FIG. 17. The sixth example embodiment is partially different from the fifth example embodiment only in the operation, and may be the same as the first to fifth example embodiments in the other parts. For this reason, a part that is different from each of the example embodiments described above will be described in detail below, and a description of the other overlapping parts will be omitted as appropriate.

(Flow of Operation)

First, with reference to FIG. 16, a flow of operation of the information processing system 10 according to the sixth example embodiment will be described. FIG. 16 is a flowchart illustrating the flow of the operation of the information processing system according to the sixth example embodiment. In FIG. 16, the same steps as those illustrated in FIG. 14 carry the same reference numerals.

Figure 16:
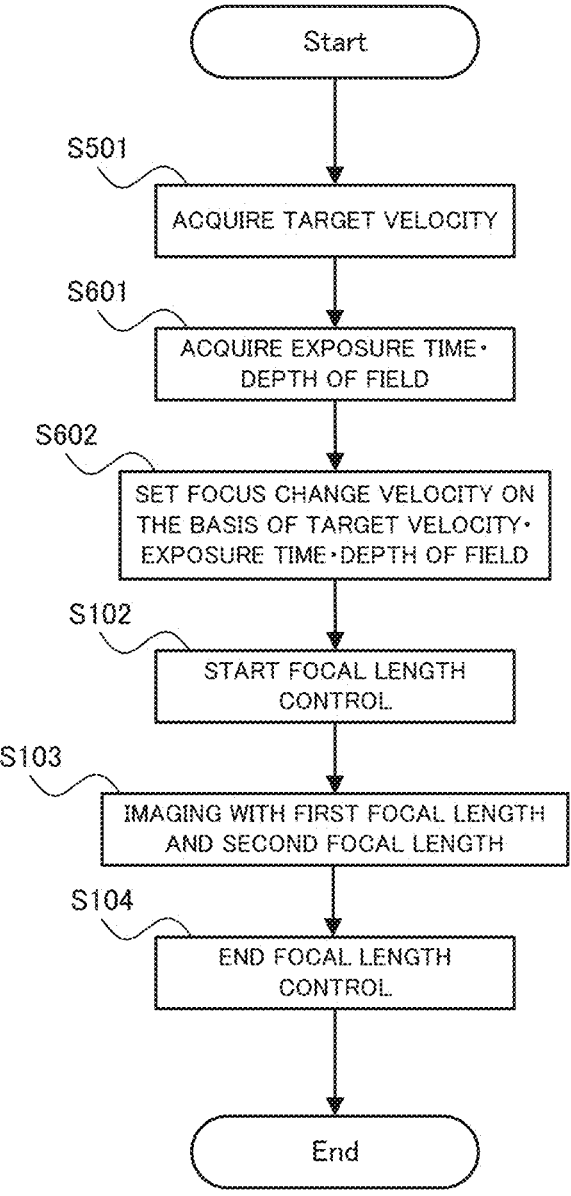
FIG. 16 is a flowchart illustrating a flow of operation of an information processing system according to a sixth example embodiment.

As illustrated in FIG. 16, when the operation of the information processing system 10 according to the sixth example embodiment is started, first, the velocity setting unit 110 acquires the target velocity (step S501). The velocity setting unit 110 acquires an exposure time and a depth of field of the cameras 18 (step S601).

Subsequently, the velocity setting unit 110 sets the focus change velocity on the basis of the target velocity, the exposure time, and the depth of field (step S602). A specific method of setting the focus change velocity will be described in detail later. The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103). Thereafter, the focus control unit 120 ends the control for changing the focal length of the camera 18 (step S104).

(Method of Setting Focus Change Velocity)

Next, with reference to FIG. 17, a specific method of setting the focus change velocity by the information processing system 10 according to the fifth example embodiment will be described. FIG. 17 is a graph illustrating the method of setting the focus change velocity in the information processing system according to the sixth example embodiment.

Figure 17:
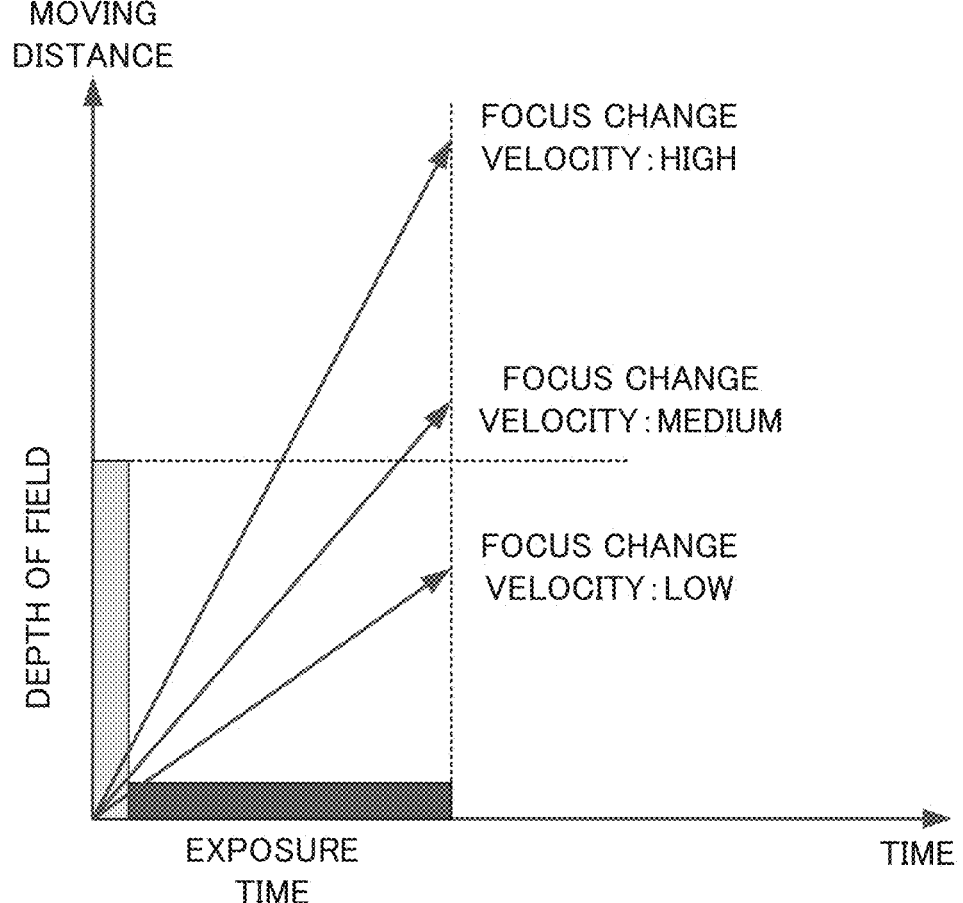
FIG. 17 is a graph illustrating a method of setting the focus change velocity in an information processing system according to a sixth example embodiment.

As illustrated in FIG. 17, the focus change velocity is preferably set such that a certain ratio of a moving distance of a focal plane per exposure time (i.e., a change amount of the focal length) is within the depth of field. For example, in a case where the focus change velocity is "high" in FIG. 17, the moving distance of the focal plane per exposure time significantly exceeds the depth of field. Therefore, it is not preferable that such a focus change velocity is set. On the other hand, in a case where the focus change velocity is "low" in FIG. 17, the moving distance of the focal plane per exposure time is within the depth of field. Therefore, it is preferable that such a focus change velocity is set. In a case where the focus change velocity is "medium" in FIG. 17, although the moving distance of the focal plane per exposure time slightly exceeds the depth of field, most of the moving distance is within the depth of field (i.e., a certain ratio is within the depth of field). Therefore, such a focus change velocity may also be allowed.

(Technical Effect)

Next, a technical effect obtained by the information processing system 10 according to the sixth example embodiment will be described.

As described in FIGS. 16 and 17, in the information processing system 10 according to the sixth example embodiment, the focus change velocity is set on the basis of the target velocity, the exposure time, and the depth of field. In this way, the focal length is controlled at an appropriate velocity, and it is thus possible to more efficiently increase the possibility that the image in focus is captured.

Seventh Example Embodiment

The information processing system 10 according to a seventh example embodiment will be described with reference to FIG. 18 to FIG. 20. The seventh example embodiment is partially different from the first to sixth example embodiments only in the configuration and operation, and may be the same as the first to sixth example embodiments in the other parts. For this reason, a part that is different from each of the example embodiments described above will be described in detail below; and a description of the other overlapping parts will be omitted as appropriate.

(Functional Configuration)

First, with reference to FIG. 18, a functional configuration of the information processing system 10 according to the seventh example embodiment will be described. FIG. 18 is a block diagram illustrating the functional configuration of the information processing system according to the seventh example embodiment. In FIG. 18, the same components as those illustrated in FIG. 2 carry the same reference numerals.

Figure 18:
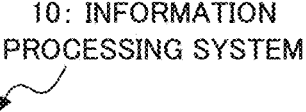
FIG. 18 is a block diagram illustrating a functional configuration of an information processing system according to a seventh example embodiment.
Figure 18:
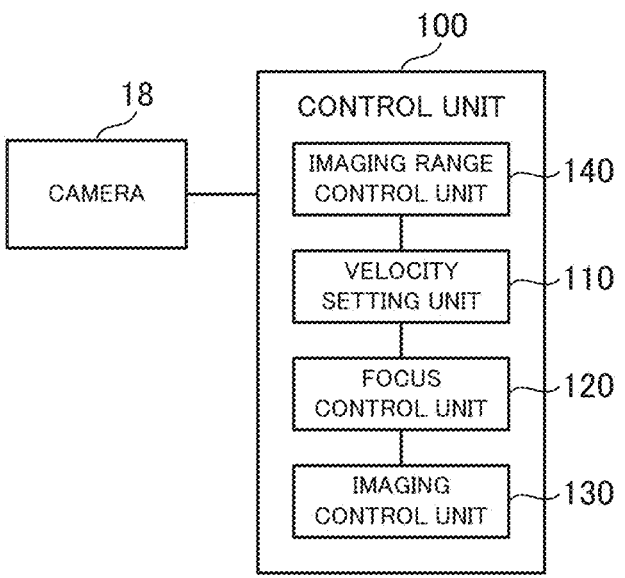

As illustrated in FIG. 18, the information processing system 10 according to the seventh example embodiment includes, as components for realizing the functions thereof, the camera 18 and the control unit 100. Especially, the control unit 100 according to the seventh example embodiment includes the velocity setting unit 110, the focus control unit 120, the imaging control unit 130, and an imaging range control unit 140. That is, the control unit 100 according to the seventh example embodiment further includes the imaging range control unit 140 in addition to the configuration in the first example embodiment (see FIG. 2). The imaging range control unit 140 may be a processing block realized or implemented by the processor 11 (see FIG. 1), for example.

The imaging range control unit 140 is configured to control an imaging range of the camera 18. The imaging range control unit 140 may be configured to control the imaging range in accordance with the information about the target to be imaged. For example, when the target is tall in height, the imaging range control unit 140 may control the imaging range of the camera 18 to be slightly high. On the other hand, when the target is short in height, the imaging range control unit 140 may control the imaging range of the camera 18 to be slightly lower. In addition, the imaging range control unit 140 may change the imaging range on the basis of a face position, an eye position, an iris position, a pupil position or the like of the target, for example. Information about the imaging range controlled by the imaging range control unit 140 is outputted to the velocity setting unit 110. In particular, the velocity setting unit 110 according to present example embodiment is configured to set the focus change velocity on the basis of the imaging range of the camera 18.

(Control Example of Imaging Range)

Next, with reference to FIG. 19, a specific configuration example for controlling the imaging range of the camera 18 will be described. FIG. 19 is a side view illustrating an example of the configuration for changing the imaging range of the camera by using a mirror.

Figure 19:
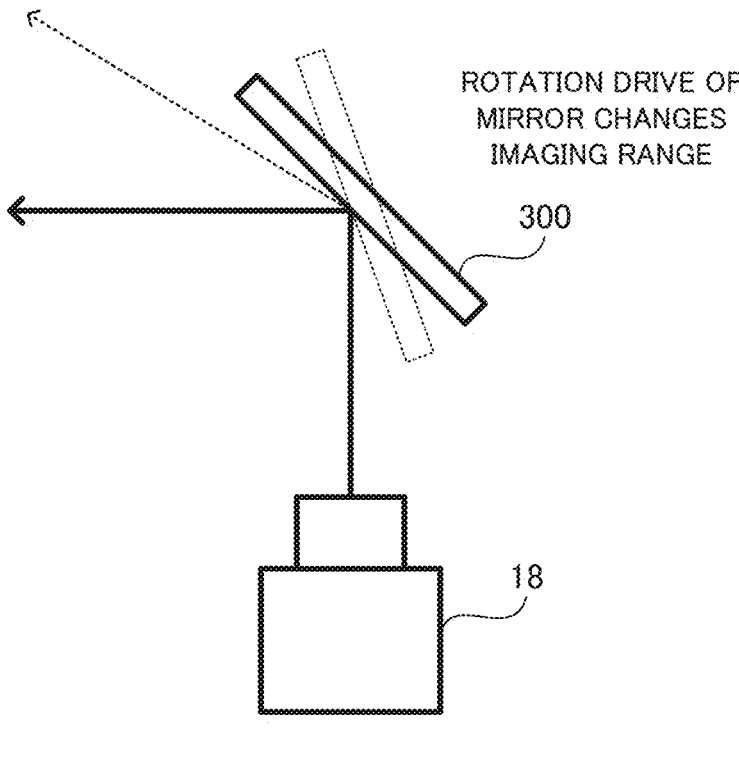
FIG. 19 is a side view illustrating an example of a configuration for changing an imaging range of a camera by using a mirror.

As illustrated in FIG. 19, it is assumed that the camera 18 is configured to image the target through a mirror 300. In this instance, the imaging range control unit 140 is capable of controlling the imaging range of the camera 18 by changing an angle of the mirror 300. Specifically, rotation drive of the mirror 300 allows a control of the imaging range of the camera 18.

The above-described configuration is an example, and the imaging range control unit 140 may change the imaging range of the camera 18 by different means from the mirror 300. For example, the imaging range control unit 140 may change the imaging range by changing a direction of the camera 18 (in other words, by changing an installation angle of the camera 18). Alternatively, a plurality of cameras 18 with differing imaging ranges may be prepared, from which the most appropriate camera 18 may selected to perform imaging.

By changing the imaging range of the camera 18, an appropriate focus change velocity is also changed. For example, when the imaging range of the camera 18 is changed, a direction of the target viewed from the camera 18 is also changed, and thus, the target velocity viewed from the camera is also changed in accordance with the imaging range. Therefore, in the case of setting the focus change velocity on the basis of the target velocity; it is also preferable to change the focus change velocity in accordance with the imaging range.

(Flow of Operation)

Next, with reference to FIG. 20, a flow of operation of the information processing system 10 according to the seventh example embodiment will be described. FIG. 20 is a flowchart illustrating the flow of the operation of the information processing system according to the seventh example embodiment. In FIG. 20, the same steps as those illustrated in FIG. 3 carry the same reference numerals.

Figure 20:
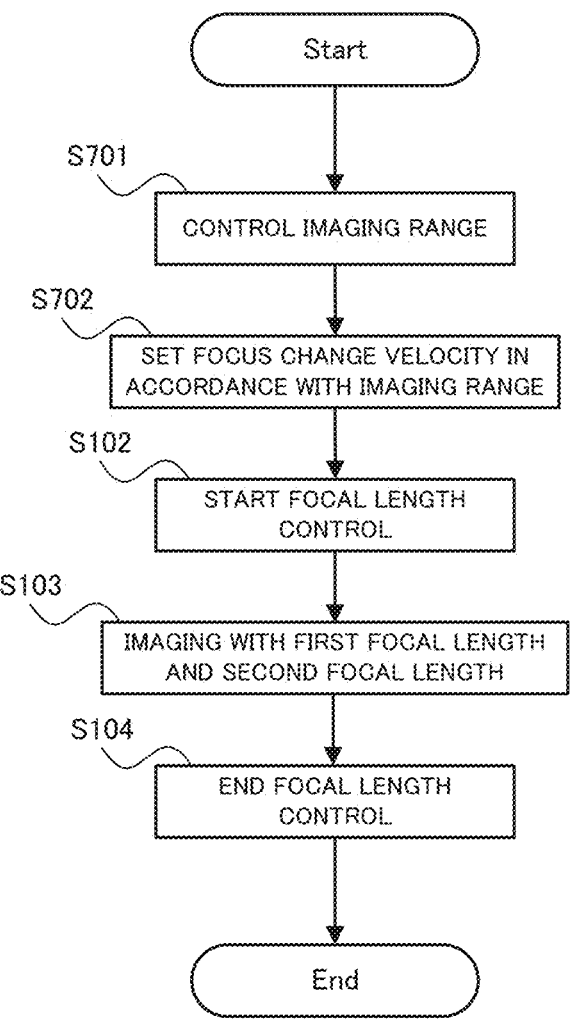
FIG. 20 is a flowchart illustrating a flow of operation of the information processing system according to the seventh example embodiment.

As illustrated in FIG. 20, when the operation of the information processing system 10 according to the seventh example embodiment is started, first, the imaging range control unit 140 controls the imaging range of the camera 18 (step S701). Thereafter, the velocity setting unit 110 sets the focus change velocity on the basis of the imaging range after the control by the imaging range control unit 140 (step S702). For example, the velocity setting unit 110 may set the focus change velocity to be high when the target is imaged from the front, and may set the focus change velocity to be low when the target is imaged from an oblique angle (at an angle shifted from the front). The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103). Thereafter, the focus control unit 120 ends the control for changing the focal length of the camera 18 (step S104).

In the above example, the focus change velocity is set based only on the imaging range, but the focus change velocity may be set by using another piece of information in addition to the imaging range. For example, the velocity setting unit 110 may set the focus change velocity on the basis of the imaging range and the target velocity. Alternatively, the velocity setting unit 110 may set the focus change velocity on the basis of the imaging range, the target velocity, the exposure time, and the depth of field.

(Technical Effect)

Next, a technical effect obtained by the information processing system 10 according to the seventh example embodiment will be described.

As described in FIG. 18 to FIG. 20, in the information processing system 10 according to the seventh example embodiment, the focus change velocity is set in accordance with the imaging range. In this way, the focal length is controlled at an appropriate velocity, and it is thus possible to more efficiently increase the possibility that the image in focus is captured.

Modified Example of Seventh Example
Embodiment

The information processing system 10 according to a modified example of the seventh example embodiment will be described with reference to FIG. 21. The modified example of the seventh example embodiment is different from the seventh example embodiment only in the operation, and may be the same as that of the first to seventh example embodiments in the other parts. For this reason, a part that is different from each of the example embodiments described above will be described in detail below, and a description of the other overlapping parts will be omitted as appropriate.

(Flow of Operation)

First, with reference to FIG. 21, a flow of operation of the information processing system 10 according to the modified example of the seventh example embodiment will be described. FIG. 21 is a flowchart illustrating the flow of the operation of the information processing system according to the modified example of the seventh example embodiment.

Figure 21:
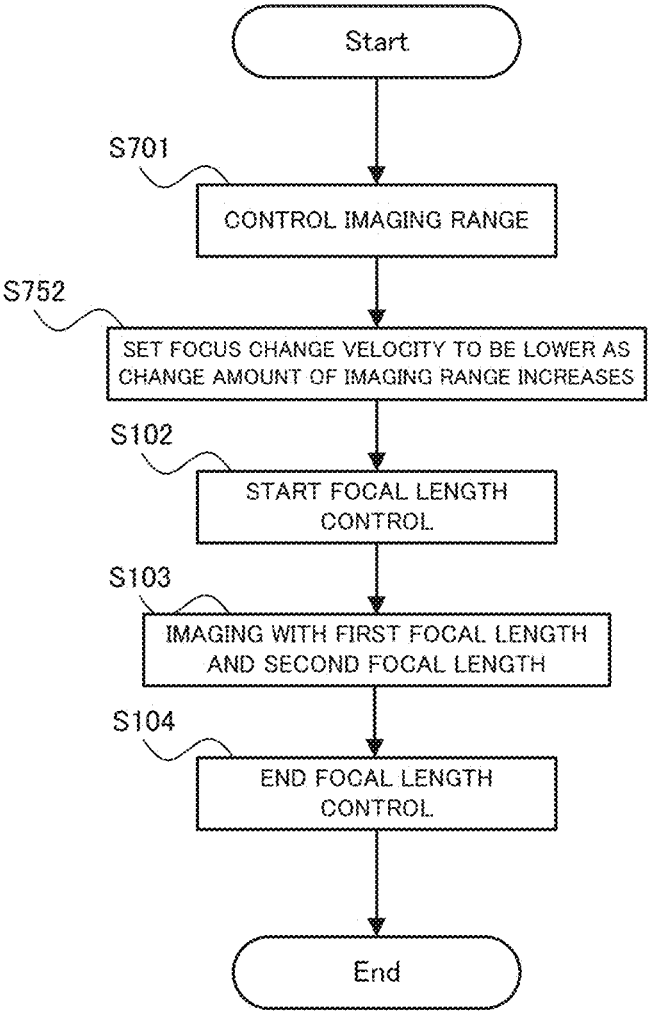
FIG. 21 is a flowchart illustrating a flow of operation of an information processing system according to a modified example of the seventh example embodiment.

In FIG. 21, the same steps as those illustrated in FIG. 20 carry the same reference numerals.

As illustrated in FIG. 21, when the operation of the information processing system 10 according to a modified example of the seventh example embodiment is started, first, the imaging range control unit 140 controls the imaging range of the camera 18 (step S701). Thereafter, the velocity setting unit 110 sets the focus change velocity to be lower as a change amount of the imaging range by the imaging range control unit 140 increases (step S752). Specifically, when the imaging range is controlled to be increased by the imaging range control unit 140, the velocity setting unit 110 sets the focus change velocity to be lower than when the imaging range is controlled to be reduced.

For example, when the target is very tall in height and the imaging range control unit 140 significantly changes the imaging range (i.e., when the imaging range is directed significantly upward), the velocity setting unit 110 may set the focus change velocity to a relatively low first velocity. Furthermore, when the target is slightly tall in height and the imaging range control unit 140 slightly changes the imaging range, the velocity setting unit 110 may set the focus change velocity to a second velocity that is higher than the first velocity. Similarly, when the target is very short in height and the imaging range control unit 140 significantly changes the imaging range (i.e., when the imaging range is directed significantly downward), the velocity setting unit 110 may set the focus change velocity to a relatively low third velocity. In addition, when the target is slightly short in height and the imaging range control unit 140 slightly changes the imaging range, the velocity setting unit 110 may set the focus change velocity to a fourth velocity that is higher than the third velocity.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103). Thereafter, the focus control unit 120 ends the control for changing the focal length of the camera 18 (step S104).

(Technical Effect)

Next, a technical effect obtained by the information processing system 10 according to the modified example of the seventh example embodiment will be described.

As described in FIG. 21, in the information processing system 10 according to the modified example of the seventh example embodiment, the focus change velocity is set to be lower as the change amount of the imaging range increases. In this way, the focal length is controlled at an appropriate velocity in accordance with the change amount of the imaging range, and it is thus possible to more efficiently increase the possibility that the image in focus is captured.

Eighth Example Embodiment

The information processing system 10 according to an eighth example embodiment will be described with reference to FIG. 22. The eighth example embodiment is partially different from the first to seventh example embodiments only in the operation, and may be the same as the first to seventh example embodiments in the other parts. For this reason, a part that is different from each of the example embodiments described above will be described in detail below, and a description of the other overlapping parts will be omitted as appropriate.

(Flow of Operation)

First, with reference to FIG. 22, a flow of operation of the information processing system 10 according to the eighth example embodiment will be described. FIG. 22 is a flowchart illustrating the flow of the operation of the information processing system according to the eighth example embodiment. In FIG. 22, the same steps as those illustrated in FIG. 3 carry the same reference numerals.

Figure 22:
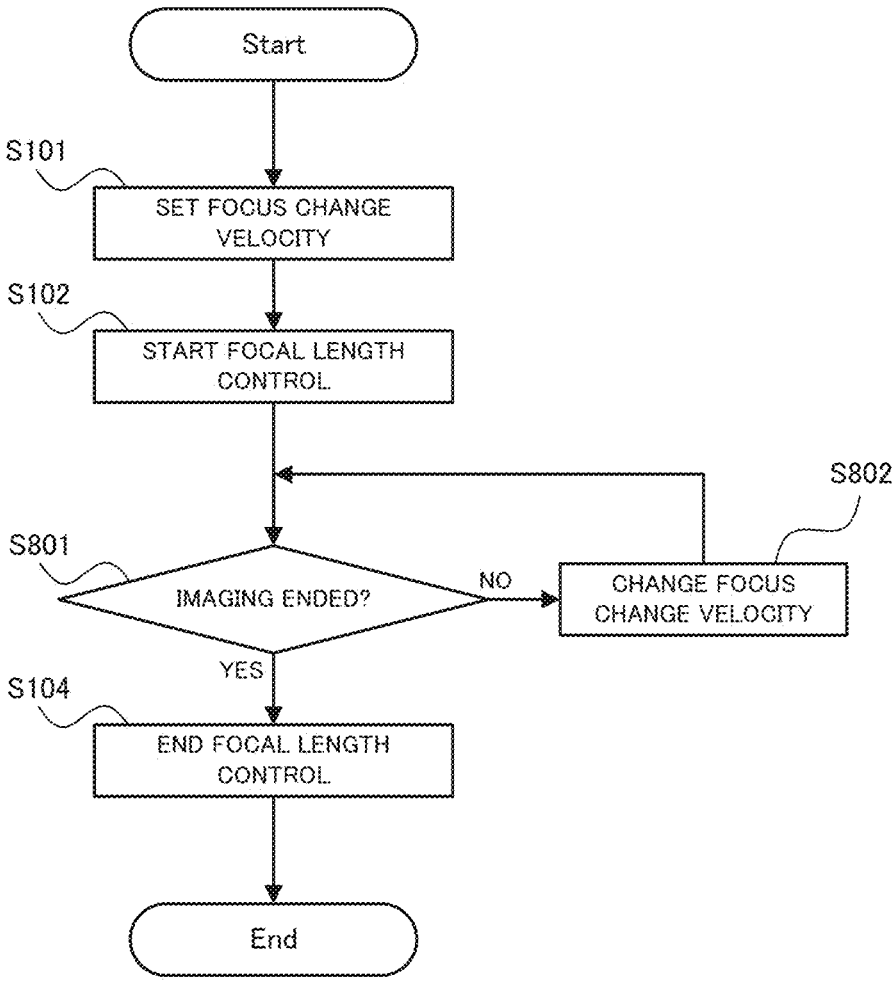
FIG. 22 is a flowchart illustrating a flow of operation of an information processing system according to an eighth example embodiment.

As illustrated in FIG. 22, when the operation of the information processing system 10 according to the eighth example embodiment is started, first, the velocity setting unit 110 sets the focus change velocity on the basis of at least one of the information about the target and the information about the camera 18 (step S101). The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Thereafter, the velocity setting unit 110 determines whether or not the imaging by the imaging control unit 110 is ended (step S801). This determination may be performed after the imaging is started or before the imaging is started.

When it is determined that the imaging by the imaging control unit 110 is ended (the step S801: YES), the focus control unit 120 ends the control for changing the focal length of the camera 18 (step S104). On the other hand, when it is determined that the imaging by the imaging control unit 110 is not ended (the step S801: NO), the velocity setting unit 110 changes the focus change velocity (step S802). Specifically, the velocity setting unit 110 sets the focus change velocity on the basis of at least one of information about a new target and the information about the camera 18 that are acquired in that timing. Therefore, after that, the focal length of the camera 18 is controlled by the focus change velocity after the change.

The above-described change in the focus change velocity may be performed a plurality of times. That is, the focus change velocity may be changed a plurality of times before the imaging of the imaging control unit 110 is ended. A period of time from when it is once changed to a next change may be set, or an upper limit of the number of changes may be set.

(Technical Effect)

Next, a technical effect obtained by the information processing system 10 according to the eighth example embodiment will be described.

As described in FIG. 22, in the information processing system 10 according to the eighth example embodiment, the focus change velocity initially set is changed before the imaging is ended. For example, the focus change velocity is changed in real time in accordance with the circumstances. In this way, the focal length is controlled at an appropriate velocity, as compared with a case where the focal length velocity is not changed (i.e., fixed) after initial settings. Therefore, it is possible to more efficiently increase the possibility that the image in focus is captured.

Ninth Example Embodiment

The information processing system 10 according to a ninth example embodiment will be described with reference to FIG. 23. The ninth example embodiment is partially different from the eighth example embodiment only in the operation, and may be the same as the first to eighth example embodiments in the other parts. For this reason, a part that is different from each of the example embodiments described above will be described in detail below; and a description of the other overlapping parts will be omitted as appropriate.

(Flow of Operation)

First, with reference to FIG. 23, a flow of operation of the information processing system 10 according to the ninth example embodiment will be described. FIG. 23 is a flowchart illustrating the flow of the operation of the information processing system according to the ninth example embodiment. In FIG. 23, the same steps as those illustrated in FIG. 22 carry the same reference numerals.

Figure 23:
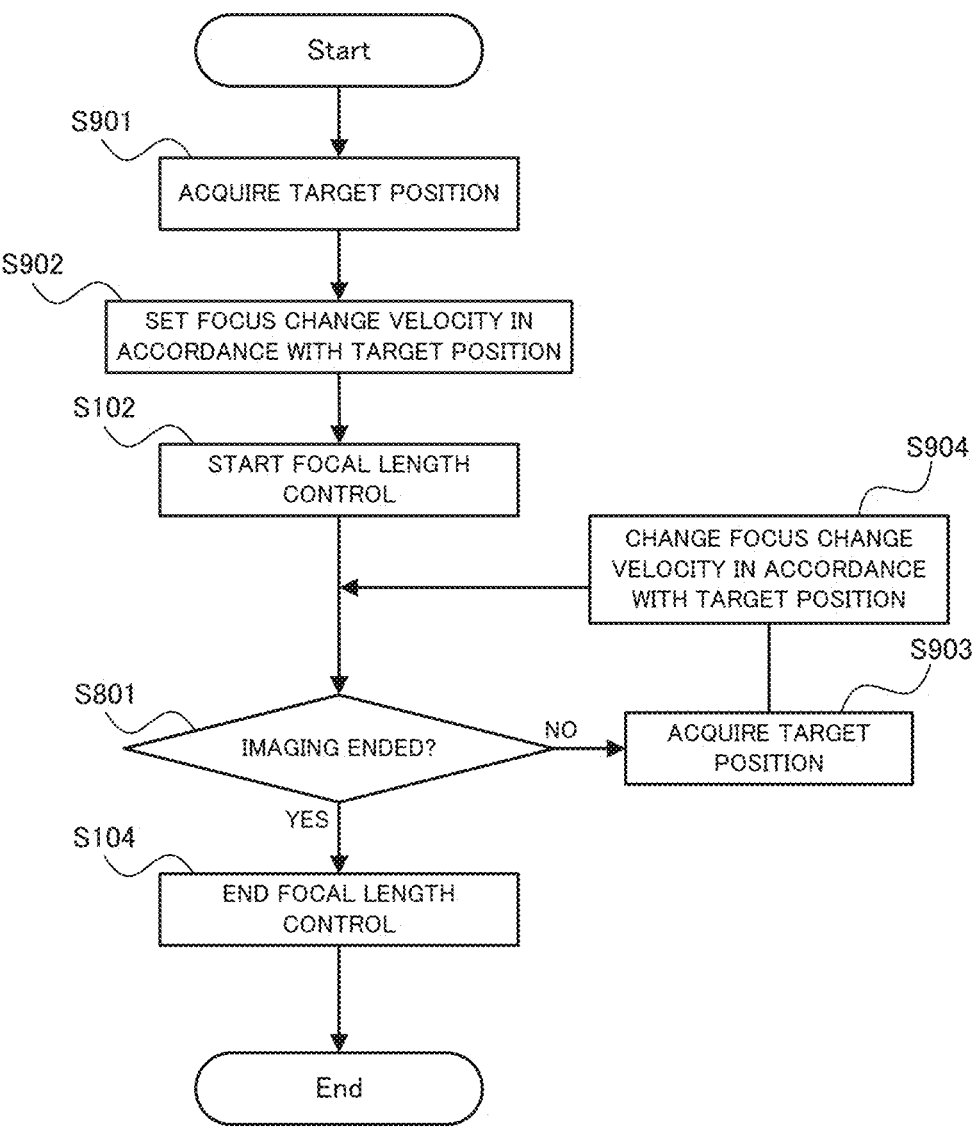
FIG. 23 is a flowchart illustrating a flow of operation of an information processing system according to a ninth example embodiment.

As illustrated in FIG. 23, when the operation of the information processing system 10 according to the ninth example embodiment starts, first, the velocity setting unit 110 acquires the target position (step S901). Then, the velocity setting unit 110 sets the focus change velocity on the basis of the acquired target position (step S902). The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Thereafter, the velocity setting unit 110 determines whether or not the imaging by the imaging control unit 110 is ended (step S801). This determination may be performed after the imaging is started or before the imaging is started.

When it is determined that the imaging by the imaging control unit 110 is ended (the step S801: YES), the focus control unit 120 ends the control for changing the focal length of the camera 18 (step S104). On the other hand, when it is determined that the imaging by the imaging control unit 110 is not ended (the step S801: NO), the velocity setting unit 110 acquires the target position again (step S903). The target position acquired here is different from the target position originally acquired in the step S901.

Then, the target velocity setting unit 110 changes the focus change velocity on the basis of the newly acquired target position (step S904). Therefore, after that, the focal length of the camera 18 is controlled by the focus change velocity after the change.

The above-described change in the focus change velocity may be performed a plurality of times. That is, the focus change velocity may be changed a plurality of times before the imaging of the imaging control unit 110 is ended. For example, when the target approaching the camera 18 is imaged, the position of the target as viewed from the camera 18 gradually becomes closer. Therefore, when the focus change velocity is set to be higher as the target position is closer, the focus change velocity may be changed to be gradually higher as the target approaches.

(Technical Effect)

Next, a technical effect obtained by the information processing system 10 according to the ninth example embodiment will be described.

As illustrated in FIG. 23, in the information processing system 10 according to the ninth example embodiment, the focus change velocity is changed as required on the basis of the position of the target. In this way, the focal length is controlled at an appropriate focus change velocity corresponding to the position of the target. Therefore, it is possible to more efficiently increase the possibility that the image in focus is captured.

Tenth Example Embodiment

The information processing system 10 according to a tenth example embodiment will be described with reference to FIG. 24 and FIG. 25. The tenth example embodiment is partially different from the first to ninth example embodiments only in the configuration and operation, and may be the same as the first to ninth example embodiments in the other parts. For this reason, a part that is different from each of the example embodiments described above will be described in detail below; and a description of the other overlapping parts will be omitted as appropriate.

(Functional Configuration)

First, with reference to FIG. 24, a functional configuration of the information processing system 10 according to the tenth example embodiment will be described. FIG. 24 is a block diagram illustrating the functional configuration of the information processing system according to the tenth example embodiment. In FIG. 24, the same components as those illustrated in FIG. 2 carry the same reference numerals.

Figure 24:
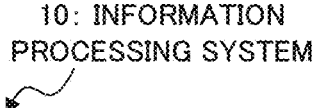
FIG. 24 is a block diagram illustrating a functional configuration of an information processing system according to a tenth example embodiment.
Figure 24:
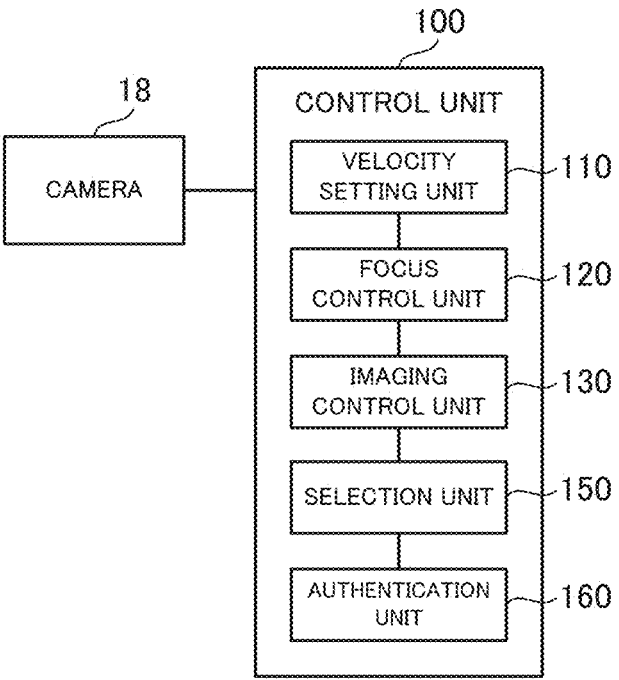

As illustrated in FIG. 24, the information processing system 10 according to the tenth example embodiment includes, as components for realizing the functions thereof, the camera 18 and the control unit 100. Especially, the control unit 100 according to the tenth example embodiment includes the velocity setting unit 110, the focus control unit 120, the imaging control unit 130, a selection unit 150, and an authentication unit 160. That is, the control unit 100 according to the tenth example embodiment further includes the selection unit 150 and the authentication unit 160, in addition to the configuration in the first example embodiment (see FIG. 2). Each of the selection unit 150 and the authentication unit 160 may be a processing block realized or implemented by the processor 11 (see FIG. 1), for example.

The selection unit 150 is configured to select an image to be used for authentication processing (i.e., processing performed by the authentication unit 160) from a plurality of images captured by the camera 18. The selection unit 150 may select an image suitable for the authentication processing (e.g., an image that improves accuracy of the authentication processing) from the plurality of images. The selection unit 150 may select one image from the plurality of images, or may select two or more images. For example, the selection unit 150 may select a highest-quality image from the plurality of images. Alternatively, the selection unit 150 may select from the plurality of images, all images in which a quality score (i.e., a score indicating an extent of quality) exceeds a predetermined threshold. Although described here is an example of selecting the image in accordance with the quality, the selection unit 150 may select the image on the basis of another standard.

The authentication unit 160 is configured to perform the authentication processing by using the image selected by the selection unit. The type of the authentication processing performed by the authentication unit 160 is not particularly limited, but the authentication unit 160 may be configured to perform biometric authentication processing using the image of the target, for example. For example, the authentication unit 160 may be configured to perform iris authentication processing using an iris image of the target. Alternatively, the authentication unit 160 may be configured to perform face authentication processing using a face image of the target. In addition, the authentication unit 160 may be configured to perform multi-modal authentication processing using a plurality of parts of the target. The authentication unit 160 may have a function of performing predetermined processing on the basis of a result of the authentication processing. For example, the authentication unit 160 may be configured to perform processing for opening a gate when the authentication processing is successful and for closing the gate when the authentication processing is failed.

(Flow of Operation)

Next, with reference to FIG. 25, a flow of operation of the information processing system 10 according to the tenth example embodiment will be described. FIG. 25 is a flowchart illustrating the flow of the operation of the information processing system according to the tenth example embodiment. In FIG. 25, the same steps as those illustrated in FIG. 3 carry the same reference numerals.

Figure 25:
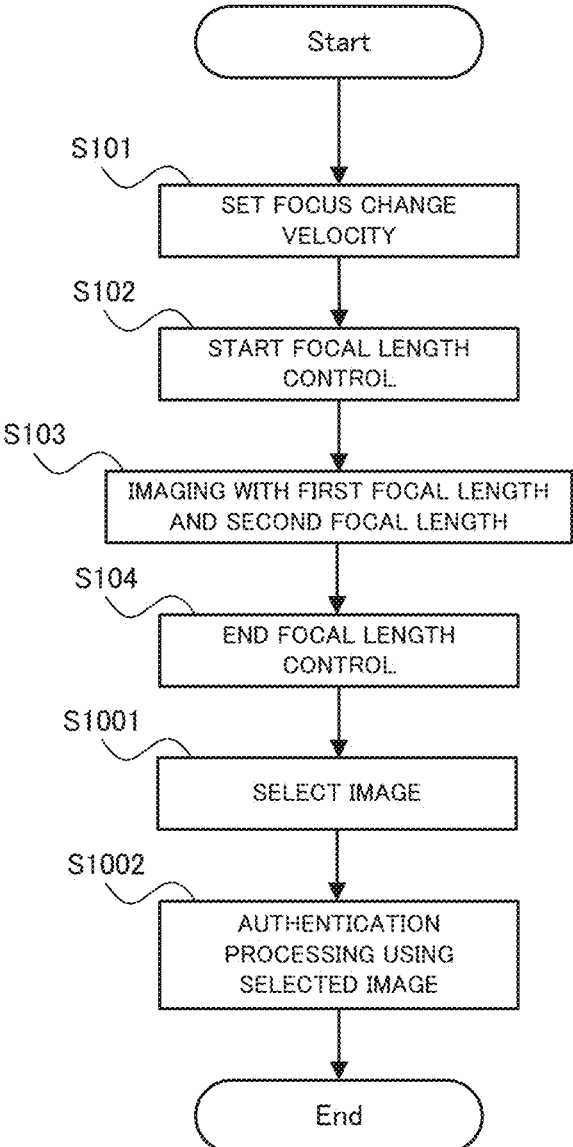
FIG. 25 is a flowchart illustrating a flow of operation of the information processing system according to the tenth example embodiment.

As illustrated in FIG. 25, when the operation of the information processing system 10 according to the tenth example embodiment is started, first, the velocity setting unit 110 sets the focus change velocity on the basis of at least one of the information about the target and the information about the camera 18 (step S101). The focus change velocity set by the velocity setting unit 110 is outputted to the focus control unit 120.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103).

Thereafter, the focus control unit 120 ends the control for changing the focal length of the camera 18 (step S104). For example, the focus control unit 120 may end the control for changing the focal length in timing when the imaging by the imaging control unit 130 is ended. Alternatively, the focus control unit 120 may end the control after a lapse of a predetermined period from the start of the control for changing the focal length.

Subsequently, the selection unit 150 selects the image to be used for the authentication processing, from the plurality of images captured (step S1001). Then, the authentication unit 160 performs the authentication processing by using the image selected by the selection unit 150 (step S1002).

(Technical Effect)

Next, a technical effect obtained by the information processing system 10 according to the tenth example embodiment will be described.

As described in FIG. 24 and FIG. 25, in the information processing system 10 according to the tenth example embodiment, the image to be used for the authentication processing is selected from the plurality of images captured by the camera 18. In this way, the authentication processing can be performed by using the image suitable for the authentication processing, and it is thus possible to improve the accuracy of the authentication processing.

Eleventh Example Embodiment

The information processing system 10 according to an eleventh example embodiment will be described with reference to FIG. 26. The eleventh example embodiment is partially different from the first to tenth example embodiments only in the configuration and operation, and may be the same as the first to tenth example embodiments in the other parts. For this reason, a part that is different from each of the example embodiments described above will be described in detail below; and a description of the other overlapping parts will be omitted as appropriate.

(Camera Configuration)

First, with reference to FIG. 26, a camera configuration of the information processing system 10 according to the eleventh example embodiment (specifically, a configuration for changing the focal length of the camera 18) will be described. FIG. 26 is a block diagram illustrating the configuration for controlling the focal length of the camera in the information processing system according to the eleventh example embodiment.

Figure 26:
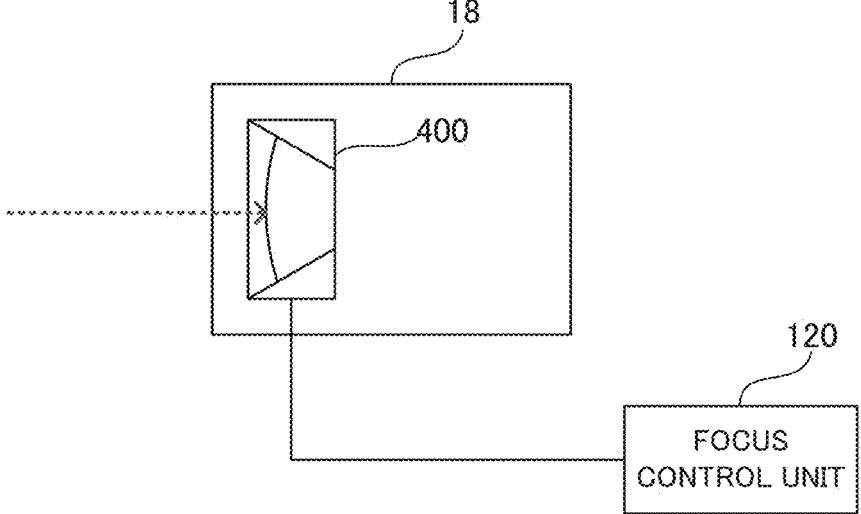
FIG. 26 is a block diagram illustrating a configuration for controlling the focal length of the camera in an information processing system according to an eleventh example embodiment.

As illustrated in FIG. 26, in the information processing system 10 according to the eleventh example embodiment, the camera 18 includes a liquid lens. Although a specific configuration of a liquid lens 400 is not particularly limited, the liquid lens 400 is configured as a lens capable of changing the focal length. Specifically, the liquid lens 400 is controllable by the focus control unit 120, and the focal length is changed in accordance with an instruction from the focus control unit 120.

(Technical Effect)

Next, a technical effect obtained by the information processing system 10 according to the eleventh example embodiment will be described.

As described in FIG. 26, in the information processing system 10 according to the eleventh example embodiment, the focal length of the camera 18 is changed by the focus control unit 120 controlling the liquid lens 400. In this way, it is possible to control the focal length of the camera 18 in an appropriate manner.

Twelfth Example Embodiment

The information processing system 10 according to a twelfth example embodiment will be described with reference to FIG. 27. The twelfth example embodiment is partially different from the first to twelfth example embodiments only in the configuration and operation, and may be the same as the first to eleventh example embodiments. For this reason, a part that is different from each of the example embodiments described above will be described in detail below, and a description of the other overlapping parts will be omitted as appropriate.

(Camera Configuration)

First, with reference to FIG. 27, a camera configuration of the information processing system 10 according to the twelfth example embodiment (specifically, a configuration for changing the focal length of the camera 18) will be described. FIG. 27 is a side view illustrating the configuration for controlling the focal length of the camera in the information processing system according to the twelfth example embodiment.

Figure 27:
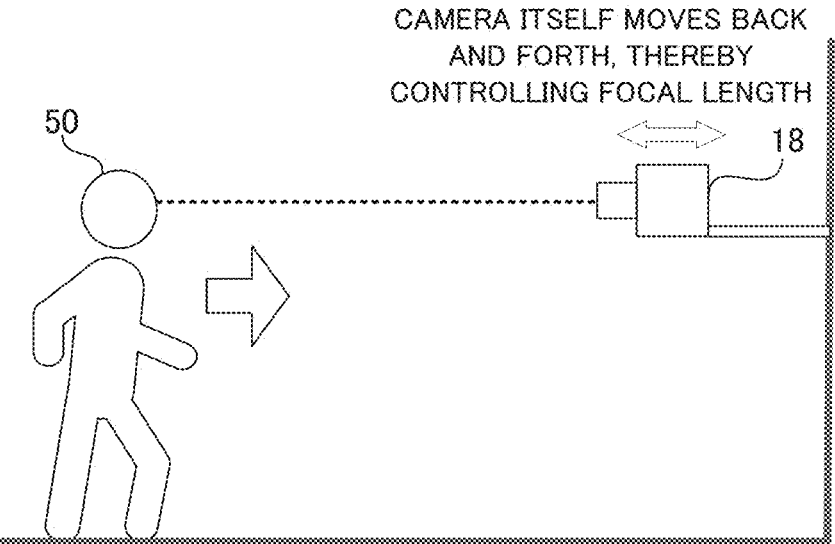
FIG. 27 is a side view illustrating a configuration for controlling the focal length of the camera in an information processing system according to a twelfth example embodiment.

As illustrated in FIG. 27, in the information processing system 10 according to the twelfth example embodiment, the imaging is performed in a situation where a target 50 approaches the camera. Especially in the twelfth example embodiment, the camera itself moves back and forth (specifically, in a front-side direction and a back-side direction when viewed from the target 50), by which the position of the camera 18 is changed, and the focal length (a focusing position) of the camera 18 is substantially changeable.

The camera 18 may be configured to be driven by a drive unit including a motor or an actuator, for example. In this case, the drive unit that drives the camera 18 is controllable by the focus control unit 120, and the focal length is changed in accordance with an instruction from the focus control unit 120. Although described here is an example in which the camera 18 is driven only back and forth, the camera 18 may be configured to be driven in another direction. For example, the camera 18 may be configured to be driven in a vertical direction (i.e., a height direction). The camera 18 may be configured to be driven in a lateral direction (i.e., a horizontal direction).

(Technical Effect)

Next, a technical effect obtained by the information processing system 10 according to the twelfth example embodiment will be described.

As described in FIG. 27, in the information processing system 10 according to the twelfth example embodiment, the focal length of the camera 18 is changed by changing the position of the camera 18 itself. In this way, it is possible to control the focal length of the camera 18 in an appropriate manner.

The configurations for changing the focal length of the camera 18 in the eleventh example embodiment and the twelfth example embodiment described above, may also be combined. Specifically; the focus controller 120 may be configured to control both the liquid lens 400 of the camera 18 and the position of the camera 18, thereby to change the focal length of the camera 18.

Thirteenth Example Embodiment

The information processing system 10 according to a thirteenth example embodiment will be described with reference to FIG. 28 and FIG. 29. The thirteenth example embodiment is partially different from the first to twelfth example embodiments only in the operation, and may be the same as the first to twelfth example embodiments in the other parts. For this reason, a part that is different from each of the example embodiments described above will be described in detail below; and a description of the other overlapping parts will be omitted as appropriate.

(Functional Configuration)

First, with reference to FIG. 28, a functional configuration of the information processing system 10 according to the tenth example embodiment will be described. FIG. 28 is a block diagram illustrating the functional configuration of information processing system according to the thirteenth example embodiment. In FIG. 28, the same components as those illustrated in FIG. 2 carry the same reference numerals.

Figure 28:
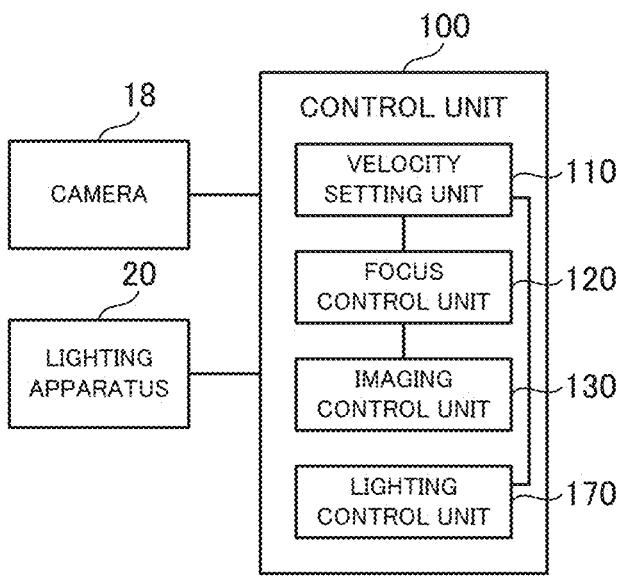
FIG. 28 is a block diagram illustrating a functional configuration of an information processing system according to a thirteenth example embodiment.

As illustrated in FIG. 28, the information processing system 10 according to the thirteenth example embodiment includes, as components for realizing the functions thereof, the camera 18, a lighting apparatus 20, and the control unit 100. That is, the information processing system 10 according to the thirteenth example embodiment includes the lighting apparatus 20 in addition to the configuration in the first example embodiment (see FIG. 2).

The lighting apparatus 20 is configured to apply illumination light to the target 50. In addition, the lighting apparatus 20 is configured to change intensity of the illumination light applied to the target 50. For example, the lighting apparatus 20 may change the intensity of the illumination light applied to the target 50 by increasing or reducing a quantity of light to be applied. Alternatively, the lighting apparatus 20 may change the intensity of the illumination light applied to the target 50 by switching on and off (i.e., by switching between a state in which the illumination light is applied and a state in which the illumination light is not applied). Alternatively, the lighting apparatus 20 may change the intensity of the illumination light applied to the target 50 by changing a direction of applying the illumination light. For example, the lighting apparatus 20 may intensify the illumination light applied to the target 50 by setting the direction of applying the illumination light to a direction in which the target 50 is present, and may weaken the illumination light applied to the target 50 by removing the direction of applying the illumination light from the direction in which the target 50 is present.

Furthermore, the lighting apparatus 20 does not emit the illumination light, but may be control intensity of ambient light applied to the target 50. For example, the lighting apparatus 20 may change the intensity of the illumination light applied to the target 50 by controlling a curtain, a light shielding member, or the like disposed at a window that takes in external light.

The control unit 100 according to the thirteenth example embodiment includes the velocity setting unit 110, the focus control unit 120, the imaging control unit 130, and a lighting control unit 170. That is, the control unit 100 according to the thirteenth example embodiment further includes the lighting control unit 170 in addition to the configuration in the first example embodiment (see FIG. 2). The lighting control unit 170 may be a processing block realized or implemented by the processor 11 (see FIG. 1), for example.

The lighting control unit 170 is configured to control the lighting apparatus 20. That is, the lighting control unit 170 is configured to control lighting apparatus 20, thereby changing the intensity of the illumination light applied to the target 50. Furthermore, the lighting control unit 170 is configured to control the intensity of the illumination light applied to the target 50 in accordance with the focus change velocity set by the velocity setting unit 110. For example, the lighting control unit 170 may control the intensity of the illumination light to be increased when the focus change velocity is set to a relatively high velocity, and may control the intensity of the illumination light to be weakened when the focus change velocity is set to a relatively low velocity.

(Flow of Operation)

Next, with reference to FIG. 29, a flow of operation of the information processing system 10 according to the thirteenth example embodiment will be described. FIG. 29 is a flow-chart illustrating the flow of the operation of the information processing system according to the thirteenth example embodiment. In FIG. 29, the same steps as those illustrated in FIG. 3 carry the same reference numerals.

Figure 29:
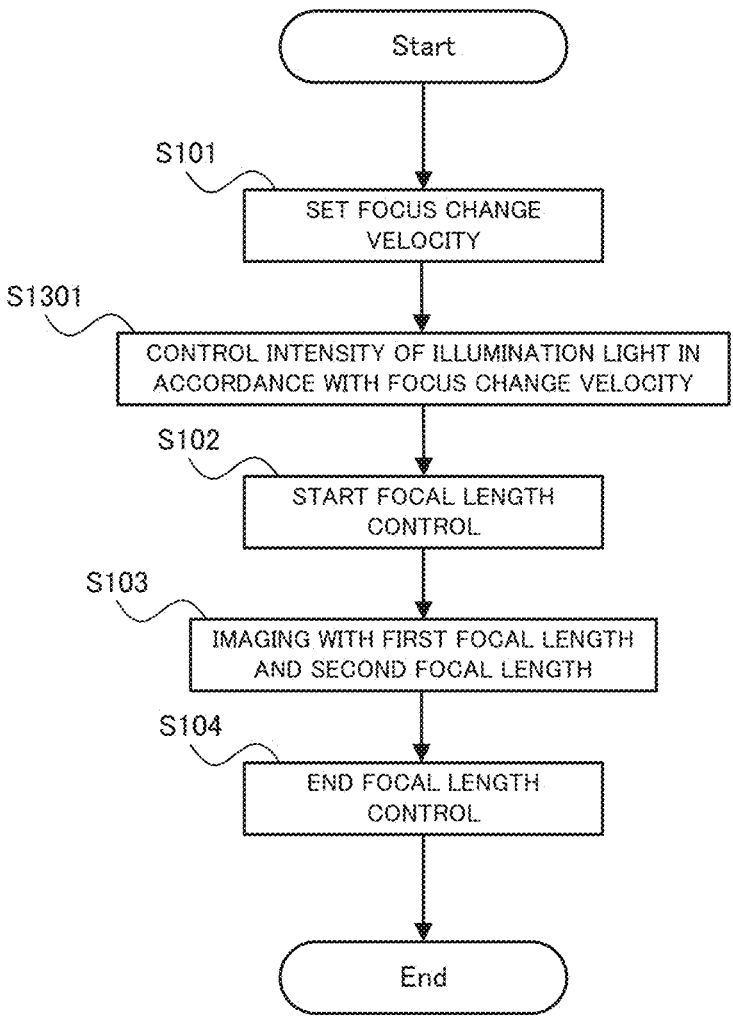
FIG. 29 is a flowchart illustrating a flow of operation of the information processing system according to the thirteenth example embodiment.

As illustrated in FIG. 29, when the operation of the information processing system 10 according to the thirteenth example embodiment is started, first, the velocity setting unit 110 sets the focus change velocity on the basis of at least one of the information about the target and the information about the camera 18 (step S101). The focus change velocity set by the velocity setting unit 110 is outputted to the focus control unit 120 and the lighting control unit 170.

Subsequently, the lighting control unit 170 controls the intensity of the illumination light in accordance with the focus change velocity set by the velocity setting unit (step S1301). The exposure time (a shutter speed) or the like of the camera 18 may be changed in accordance with the intensity of the illumination light after the control.

Subsequently, the focus control unit 120 starts the control for changing the focal length of the camera 18 at the focus change velocity set by the velocity setting unit 110 (step S102). Then, the imaging control unit 130 controls the camera 18 to perform imaging with the first focal length and the second focal length (step S103). Thereafter, the focus control unit 120 ends the control for changing the focal length of the camera 18 (step S104).

(Technical Effect)

Next, a technical effect obtained by the information processing system 10 according to the thirteenth example embodiment will be described.

As described in FIG. 28 and FIG. 29, in the information processing system 10 according to the thirteenth example embodiment, the intensity of the illumination light is controlled in accordance with the focus change velocity: In this way, even when the exposure time is shortened due to an increase in the focus change velocity, it is possible to intensify the illumination light and to capture a bright image.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

Supplementary Notes

The example embodiments described above may be further described as, but not limited to, the following Supplementary Notes below.
(Supplementary Note 1)

An information processing system according to Supplementary Note 1 is an information processing system including: a velocity setting unit that sets a focus change velocity, which is a velocity for changing a focal length of a camera, on the basis of at least one of information about a target and information about the camera that images the target: a focus control unit that controls the camera to change the focal length of the camera a plurality of times at the focus change velocity: and an imaging control unit that controls the camera to perform imaging with a first focal length and a second focal length.
(Supplementary Note 2)

An information processing system according to Supplementary Note 2 is the information processing system according to Supplementary Note 1, wherein the focus control unit controls the camera such that the focal length of the camera is repeatedly increased or reduced within a predetermined section that is from a first reference distance to a second reference distance.
(Supplementary Note 3)

An information processing system according to Supplementary Note 3 is the information processing system according to Supplementary Note 2, wherein the focus control unit changes at least one of the first reference distance and the second reference distance, on the basis of the information about the target.
(Supplementary Note 4)

An information processing system according to Supplementary Note 4 is the information processing system according to Supplementary Note 3, wherein the focus control unit changes at least one of the first reference distance and the second reference distance such that the predetermined section becomes narrower as the target approaches the camera.
(Supplementary Note 5)

An information processing system according to Supplementary Note 5 is the information processing system according to any one of Supplementary Notes 1 to 4, wherein the velocity setting unit sets the focus change velocity on the basis of a moving velocity of the target.
(Supplementary Note 6)

An information processing system according to Supplementary Note 6 is the information processing system according to Supplementary Note 5, wherein the velocity setting unit sets the focus change velocity on the basis of an exposure time and a depth of field of the camera in addition to the moving velocity of the target.
(Supplementary Note 7)

An information processing system according to Supplementary Note 7 is the information processing system according to any one of Supplementary Notes 1 to 6, further including an imaging range control unit that changes an imaging range of the camera on the basis of the information about the target, wherein the velocity setting unit sets the focus change velocity on the basis of the imaging range.
(Supplementary Note 8)

An information processing system according to Supplementary Note 8 is the information processing system according to Supplementary Note 7, wherein the velocity setting unit sets the focus change velocity to be lower as a change amount of the imaging range by the imaging range control unit increases.
(Supplementary Note 9)

An information processing system according to Supplementary Note 9 is the information processing system according to any one of Supplementary Notes 1 to 8, wherein the velocity setting unit changes the focus change velocity between when the focus change velocity is initially set and when imaging by the imaging control unit is ended.
(Supplementary Note 10)

An information processing system according to Supplementary Note 10 is the information processing system according to Supplementary Note 9, wherein the velocity setting unit changes the focus change velocity on the basis of a position of the target.
(Supplementary Note 11)

An information processing system according to Supplementary Note 11 is the information processing system according to any one of Supplementary Notes 1 to 10, further including: an authentication unit that performs authentication processing on the basis of an image of the target; and a selection unit that selects at least one image to be used for the authentication processing, from a plurality of images acquired by the imaging control unit.
(Supplementary Note 12)

An information processing system according to Supplementary Note 12 is the information processing system according to any one of Supplementary Notes 1 to 11, wherein the focus control unit controls a liquid lens provided in the cameras, thereby changing the focal length.
(Supplementary Note 13)

An information processing system according to Supplementary Note 13 is the information processing system according to any one of Supplementary Notes 1 to 12, wherein the focus control unit changes the focal length by changing a position of the camera.
(Supplementary Note 14)

An information processing system according to Supplementary Note 14 is the information processing system according to any one of Supplementary Notes 1 to 13, further including a lighting control unit that controls intensity of illumination light applied to the target, in accordance with the focus change velocity.

(Supplementary Note 15)

An information processing method according to Supplementary Note 15 is an information processing method that is executed by at least one computer, the information processing method including: setting a focus change velocity, which is a velocity for changing a focal length of a camera, on the basis of at least one of information about a target and information about the camera that images the target: controlling the camera to change the focal length of the camera a plurality of times at the focus change velocity: and controlling the camera to perform imaging with a first focal length and a second focal length.

(Supplementary Note 16)

A recording medium according to Supplementary Note 16 is a recording medium on which a computer program that allows at least one computer to execute an information processing method is recorded, the information processing method including: setting a focus change velocity, which is a velocity for changing a focal length of a camera, on the basis of at least one of information about a target and information about the camera that images the target: controlling the camera to change the focal length of the camera a plurality of times at the focus change velocity; and controlling the camera to perform imaging with a first focal length and a second focal length.

(Supplementary Note 17)

An information processing apparatus according to Supplementary Note 17 is an information processing apparatus including: a velocity setting unit that sets a focus change velocity, which is a velocity for changing a focal length of a camera, on the basis of at least one of information about a target and information about the camera that images the target: a focus control unit that controls the camera to change the focal length of the camera a plurality of times at the focus change velocity: and an imaging control unit that controls the camera to perform imaging with a first focal length and a second focal length.

(Supplementary Note 18)

A computer program according to Supplementary Note 18 is a computer program that allows at least one computer to execute an information processing method, the information processing method including: setting a focus change velocity, which is a velocity for changing a focal length of a camera, on the basis of at least one of information about a target and information about the camera that images the target: controlling the camera to change the focal length of the camera a plurality of times at the focus change velocity: and controlling the camera to perform imaging with a first focal length and a second focal length.

This disclosure is allowed to be changed, if desired, without departing from the essence or spirit of this disclosure which can be read from the claims and the entire specification. An information processing system, an information processing method, a recording medium, and a data structure with such changes are also intended to be within the technical scope of this disclosure.

DESCRIPTION OF REFERENCE CODES

10 Information processing system
11 Processor
18 Camera
20 Lighting apparatus
50 Target
100 Control unit
110 Velocity setting unit
120 Focus control unit
130 Imaging control unit
140 Imaging range control unit
150 Selection unit
160 Authentication unit
170 Lighting control unit
300 Mirror
400 Liquid lens

The invention claimed is:

1. An information processing system comprising:
at least one memory that is configured to store instructions; and
at least one processor that is configured to execute the instructions to:
set a focus change velocity, which is a velocity for changing a focal length of a camera, on the basis of at least one of information about a target and information about the camera that images the target;
control the camera to change the focal length of the camera a plurality of times at the focus change velocity;
control the camera to perform imaging with a first focal length and a second focal length;
change an imaging range of the camera on the basis of the information about the target; and
set the focus change velocity on the basis of the imaging range.

2. The information processing system according to claim 1, wherein the at least one processor is configured to execute the instructions to control the camera such that the focal length of the camera is repeatedly increased or reduced within a predetermined section that is from a first reference distance to a second reference distance.

3. The information processing system according to claim 2, wherein the at least one processor is configured to execute the instructions to change at least one of the first reference distance and the second reference distance, on the basis of the information about the target.

4. The information processing system according to claim 3, wherein change at least one of the first reference distance and the second reference distance such that the predetermined section becomes narrower as the target approaches the camera.

5. The information processing system according to claim 1, wherein set the focus change velocity on the basis of a moving velocity of the target.

6. The information processing system according to claim 5, wherein the at least one processor is configured to execute the instructions to set the focus change velocity on the basis of an exposure time and a depth of field of the camera in addition to the moving velocity of the target.

7. The information processing system according to claim 1, the at least one processor is configured to execute the instructions to set the focus change velocity to be lower as a change amount of the imaging range increases.

8. The information processing system according to claim 1, wherein the at least one processor is configured to execute the instructions to change the focus change velocity between when the focus change velocity is initially set and when imaging is ended.

9. The information processing system according to claim 8, wherein the at least one processor is configured to execute the instructions to change the focus change velocity on the basis of a position of the target.

10. The information processing system according to claim 1, wherein the at least one processor is configured to execute the instructions to:

perform authentication processing on the basis of an image of the target; and select at least one image to be used for the authentication processing, from a plurality of images acquired.

11. The information processing system according to claim 1, wherein the at least one processor is configured to execute the instructions to control a liquid lens provided in the cameras, thereby changing the focal length.

12. The information processing system according to claim 1, wherein the at least one processor is configured to execute the instructions to change the focal length by changing a position of the camera.

13. The information processing system according to claim 1, wherein the at least one processor is configured to execute the instructions to control intensity of illumination light applied to the target, in accordance with the focus change velocity.

14. An information processing method that is executed by at least one computer, the information processing method comprising:

setting a focus change velocity, which is a velocity for changing a focal length of a camera, on the basis of at least one of information about a target and information about the camera that images the target;

controlling the camera to change the focal length of the camera a plurality of times at the focus change velocity;

controlling the camera to perform imaging with a first focal length and a second focal length;

changing an imaging range of the camera on the basis of the information about the target; and setting the focus change velocity on the basis of the imaging range.

15. A non-transitory recording medium on which a computer program that allows at least one computer to execute an information processing method is recorded, the information processing method including:

setting a focus change velocity, which is a velocity for changing a focal length of a camera, on the basis of at least one of information about a target and information about the camera that images the target;

controlling the camera to change the focal length of the camera a plurality of times at the focus change velocity; and controlling the camera to perform imaging with a first focal length and a second focal length;

changing an imaging range of the camera on the basis of the information about the target; and setting the focus change velocity on the basis of the imaging range.

* * * * *